(12) United States Patent
Ningombam et al.

(10) Patent No.: US 8,893,106 B2
(45) Date of Patent: Nov. 18, 2014

(54) CHANGE ANALYSIS ON ENTERPRISE SYSTEMS PRIOR TO DEPLOYMENT

(75) Inventors: Macks Singh Ningombam, Karnataka (IN); Nitin Jain, Sunnyvale, CA (US); Sourav Mukherjee, South San Francisco, CA (US); Amit Bhalla, Haryana (IN); Anurag Singh, Karnataka (IN); Aawardhan Logandan, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 928 days.

(21) Appl. No.: 13/035,954

(22) Filed: Feb. 26, 2011

(65) Prior Publication Data

US 2011/0225575 A1      Sep. 15, 2011

Related U.S. Application Data

(60) Provisional application No. 61/314,081, filed on Mar. 15, 2010.

(51) Int. Cl.
*G06F 9/44*      (2006.01)
*G06F 11/30*     (2006.01)
*G06F 9/445*     (2006.01)

(52) U.S. Cl.
CPC ............... *G06F 8/65* (2013.01); *G06F 11/302* (2013.01); *G06F 11/3051* (2013.01)
USPC ........................................................ 717/170

(58) Field of Classification Search
CPC ...... G06F 8/65; G06F 11/302; G06F 11/3051
USPC ........................................................ 717/170
See application file for complete search history.

(56) References Cited

U.S. PATENT DOCUMENTS

| | | | |
|---|---|---|---|
| 6,338,149 B1 | 1/2002 | Ciccone, Jr. et al. | |
| 7,191,435 B2 | 3/2007 | Lau et al. | |
| 2006/0080656 A1 | 4/2006 | Cain et al. | |
| 2006/0112152 A1* | 5/2006 | Napier et al. | 707/203 |
| 2006/0225072 A1 | 10/2006 | Lari et al. | |

(Continued)

OTHER PUBLICATIONS

Chang et al., "A Cross-Site Patch Management Model and Architecture Design for Large Scale Heterogeneous Environment," 2005, IEEE, 6pg.*

(Continued)

*Primary Examiner* — Ryan Coyer
(74) *Attorney, Agent, or Firm* — Omkar K. Suryadevara; Silicon Valley Patent Group LLP

(57) ABSTRACT

A computer ("patch analysis computer") retrieves from a website, metadata describing one or more patch files to be used to change software in one or more computers ("target computers"). Prior to installation of the patch files in a target computer, the patch analysis computer performs analysis on the patch files and on the target computer and on application of the patch files to the target computer. The analysis is based on the retrieved metadata and based on configuration data of the target computer. Subsequent to performing the analysis, the management computer displays a report resulting from the analysis including one or more operations to fix issues found during analysis, and receives input from a human on specific patch files and operations. In response to receipt of human input, the patch analysis computer performs operations approved by the human and applies the patch files to the target computer.

20 Claims, 12 Drawing Sheets

(56) References Cited

U.S. PATENT DOCUMENTS

| | | | |
|---|---|---|---|
| 2007/0169065 A1* | 7/2007 | Janson et al. | 717/162 |
| 2007/0288903 A1 | 12/2007 | Manglik et al. | |
| 2008/0098099 A1 | 4/2008 | Khasnis et al. | |
| 2008/0178167 A1 | 7/2008 | Sriram et al. | |
| 2008/0178168 A1 | 7/2008 | Sriram et al. | |
| 2008/0178173 A1 | 7/2008 | Sriram et al. | |
| 2009/0205012 A1* | 8/2009 | Jain et al. | 726/1 |
| 2009/0259989 A1* | 10/2009 | Cifuentes et al. | 717/110 |
| 2009/0288078 A1* | 11/2009 | Makonahalli et al. | 717/174 |

OTHER PUBLICATIONS

IBM, "Method of validating patch requirements during the installation process," IP.COM # IPCOM000157228D, 2007, 4pg.*

Le Berre et al., "Dependency Management for the Eclipse Ecosystem," ACM, 2009, 10pg.*

Oracle® Database 2 Day DBA 11g Release 1 (11.1), Part No. B28301-03, Mar. 2008, pp. 272.

Oracle® Universal Installer and OPatch User's Guide, 11g Release 1 (11.1) for Windows and UNIX, Part No. B31207-03, Jan. 2008, pp. 188.

Chandiramani P. et al. "Saving Time and Labor on Oracle Patching With Enterprise Manager Provisioning Pack—a case study with Oracle Internal IT", Jan. 2008, pp. 13.

Oracle® Enterprise Manager Advanced Configuration, 10g Release 4 (10.2.0.4.0), E-10954-01, Oct. 2007, pp. 474.

Oracle® Enterprise Manager, Concepts, 10g Release 1 (10.1), Part No. B12016-0, Dec. 2003, pp. 108.

Oracle® Applications, Patching Procedures, Release 12 (12.0.3), Part No. B31567-03, Oct. 2007, pp. 126.

Marquis H. "ITIL and Configuration Management: Where to begin", Apr. 18, 2007, pp. 4.

Sharma, R. et al. "ITIL Best Practices with Oracle Enterprise Manager 10g and Oracle Siebel Help Desk", An Oracle White Paper, Jan. 2008, pp. 22.

Shah, R. et al. "Critical Patch Update Implementation Best Practices", An Oracle White Paper, Dec. 2006, pp. 15.

Oracle Data Sheet, Oracle Enterprise Manager 10g Configuration Management Pack for Oracle Database, Feb. 2007, pp. 9.

Datta, S. et al. "Understanding and Automating Operations Around the Oracle Installer Inventory", An Oracle White Paper, Nov. 2004, pp. 17.

Oracle® Universal Installer, Concepts Guide, 10g Release 1 (10.1), Part No. B12140-01, Dec. 2003, pp. 66.

Randy Franklin Smith Gaining Control of Security Patch Management, Security Watch, Aug. 2003, 4 pages.

Peter Mell and Miles C.Tracy, Procedures for Handling Security Patches, NIST Special Publication 800-40, Aug. 2002, 100 pages.

Oracle Data Sheet, Oracle Enterprise Manager 10g Configuration Management Pack for Oracle Application Server, Oct. 2005, 4 pages.

Steve Fogel, Janet Stern, and Colin McGregor, Oracle® Database, 2 Day DBA, 11g Release 1 (11.1), Part No. B28301-03, Mar. 2008, 272 pages.

Daniel Dern, Patch Management Tools, Processor, Nov. 19, 2004, 3 pages.

Ken Conrad, Securing Your Network Environment Software Distribution & Patch Management, Microsoft Corporation, 2003.

Microsoft White Paper, Understanding Patch and Update Management: Microsoft's Software Update Strategy, Microsoft Corporation, Oct. 2003.

* cited by examiner

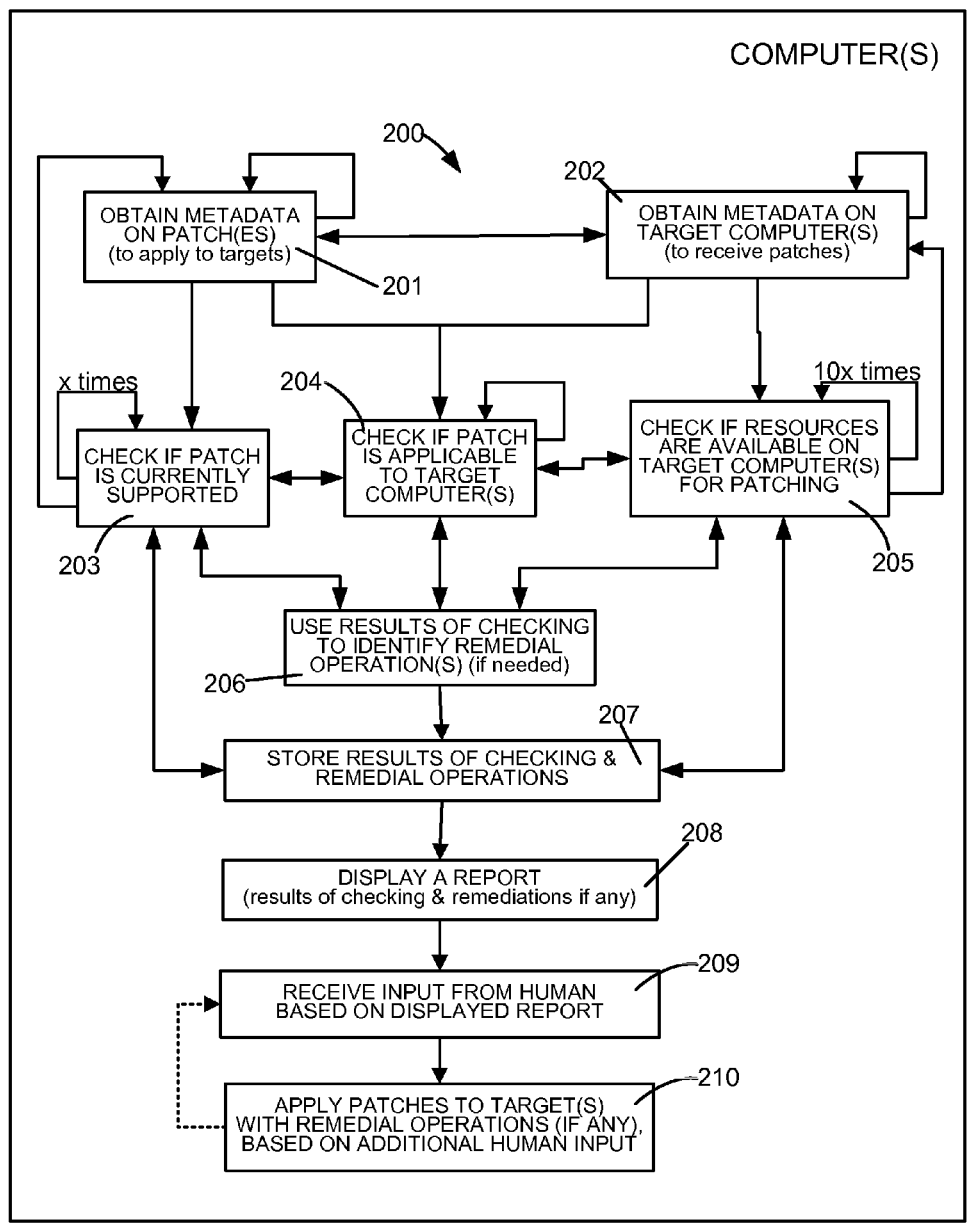

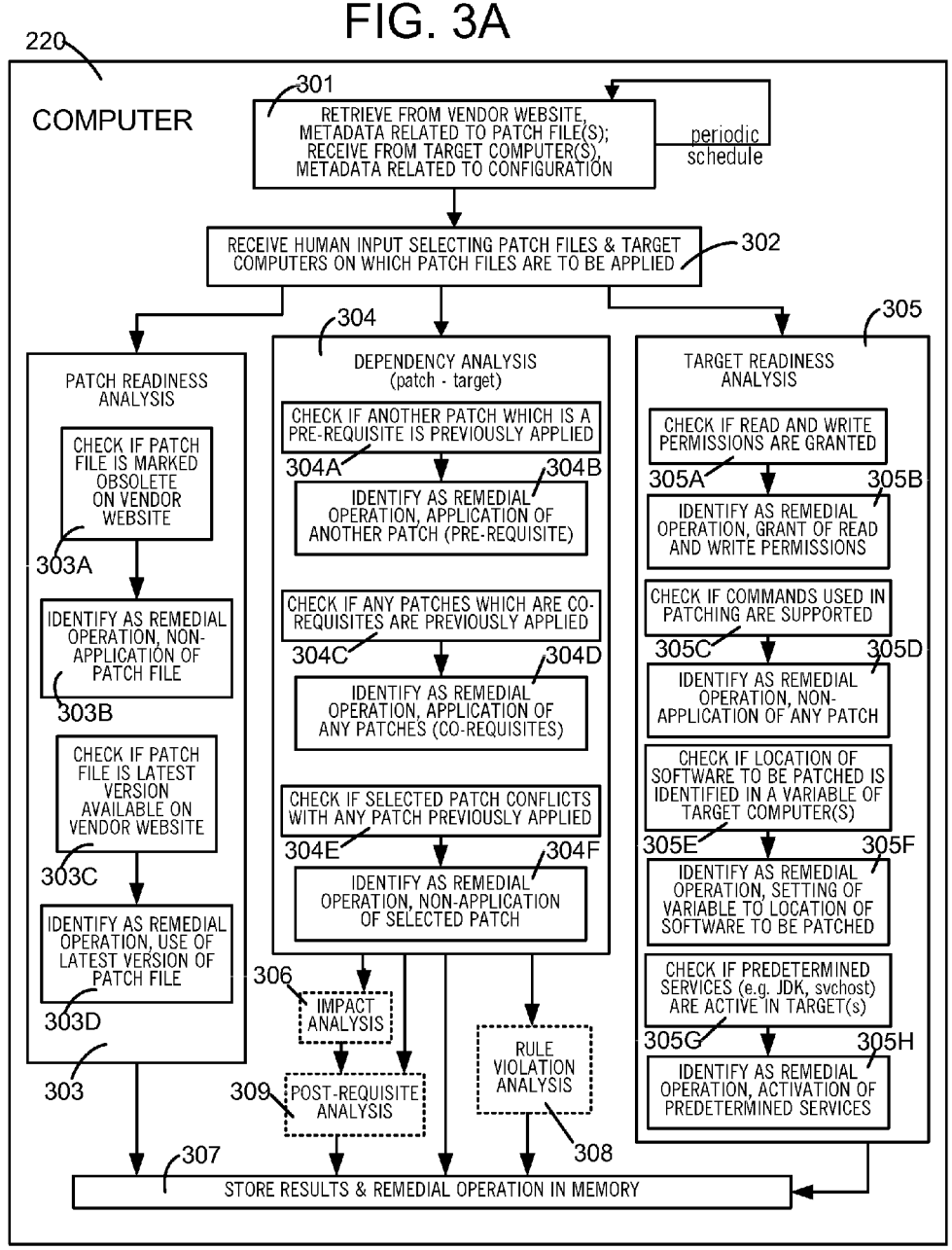

FIG. 3C

Status

Target Analysis 2007-08-17
System Analysis Never Run
Metalink Analysis Never Run Results Analysis ˅ | View ˅ | Accept | Reject | Clear Decision

| Action | Recommendation | Check Performed | Choose Targets |
|--------|----------------|-----------------|----------------|
|        |                | CheckCentralInventoryForOH | pass |
|        |                | CheckCentralInventoryForRWSession | pass |
|        |                | CheckCentralInventoryLocation | pass |
|        |                | CheckSystemCommandAvailable | pass |
|        | Shutdown and stop the active instances. | CheckActiveFilesandExecutables | fail |
|        |                | CheckActiveServices | pass |
|        |                | CheckifOHLockedforPatching | pass |
|        |                | CheckIDK | pass |
|        |                | CheckOracleHome | pass |
|        |                | CheckOraInstLocation | pass |

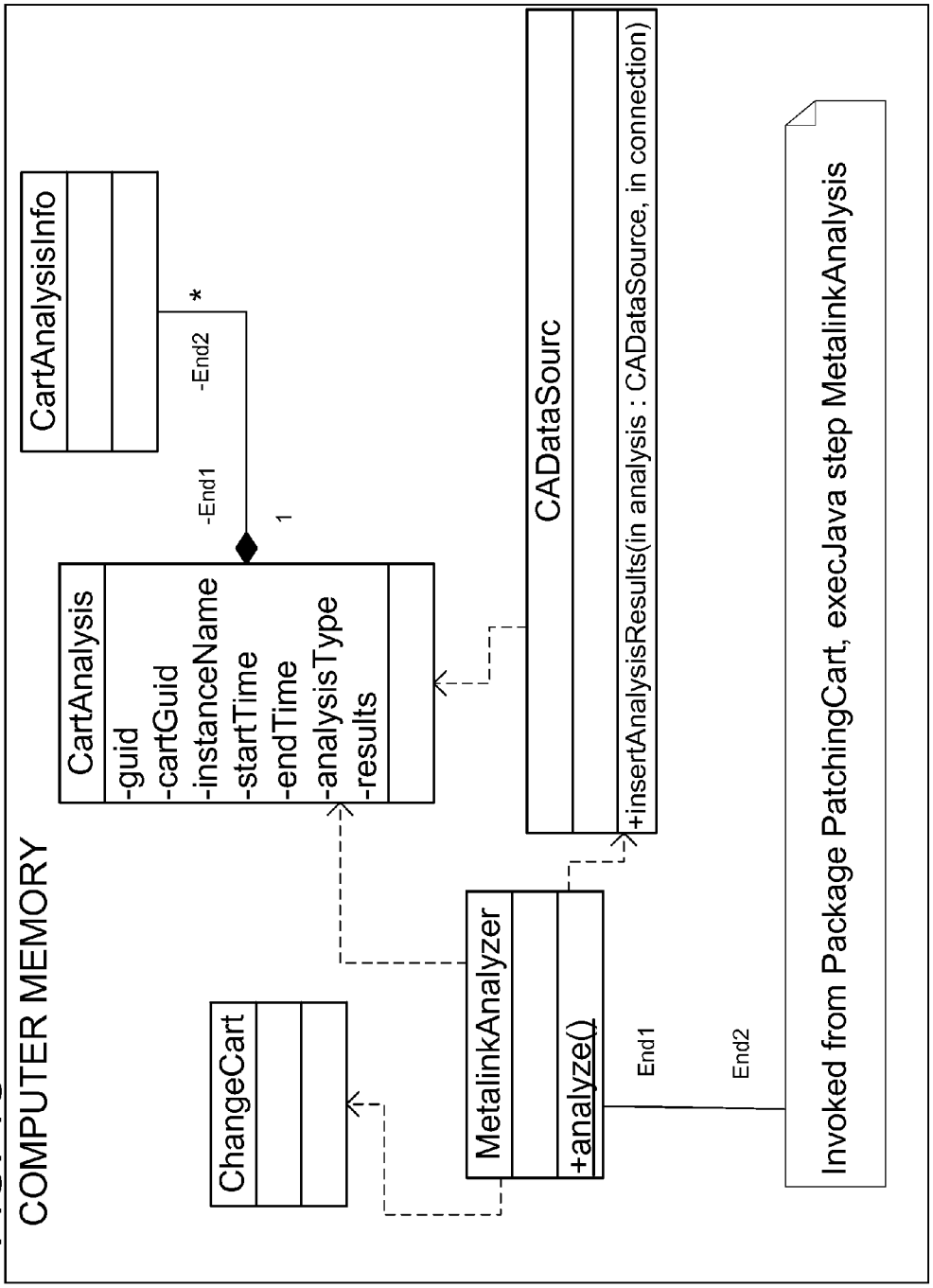

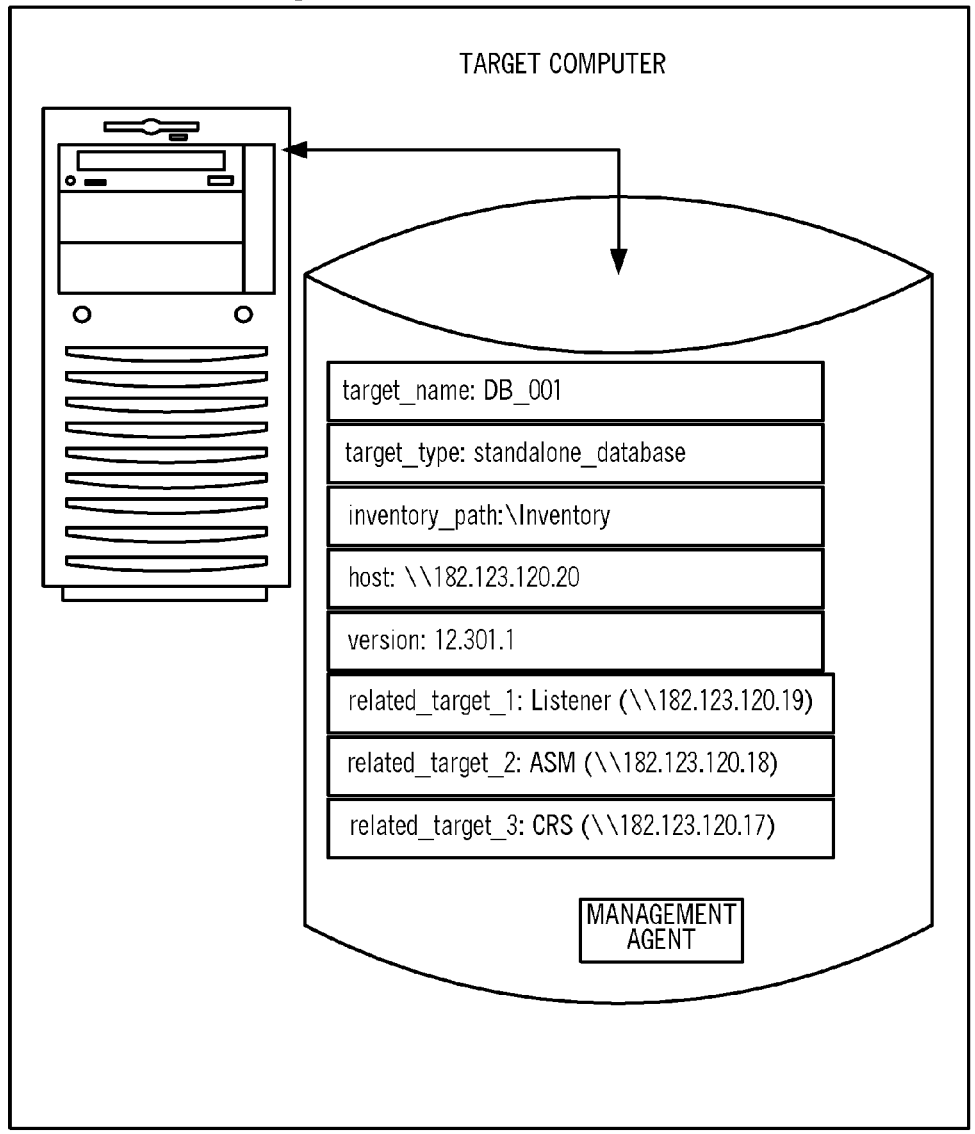

CHANGE ANALYSIS ON ENTERPRISE SYSTEMS PRIOR TO DEPLOYMENT

CROSS-REFERENCE TO PROVISIONAL APPLICATION

This application claims priority under 35 USC §119 (e) from U.S. Provisional Application No. 61/314,081 filed on Mar. 15, 2010 having the title CHANGE ANALYSIS ON ENTERPRISE SYSTEMS PRIOR TO DEPLOYMENT, filed by Ningombam et al., which is incorporated by reference herein in its entirety.

BACKGROUND

Any software that is previously installed ("pre-installed software") and currently executing in systems of computers in an enterprise or organization may need to be changed, for example to keep up with new requirements, latest technologies, and fix defects ("bugs"). A vendor of the pre-installed software may release additional software ("patch") to fix bugs in the pre-installed software. Patches are typically released in a binary form, and used to overwrite portions of pre-installed software also in binary form. Note that if the pre-installed software is in another form, e.g. byte codes, then the patch is also released in the same form, e.g. also byte codes. For example, Oracle® Corporation releases a bundle of patches ("Critical Patch Update" or CPU) on a quarterly basis to provide security fixes for ORACLE® products.

Specifically, ORACLE® CPUs are released every quarter on a pre-announced date at a predetermined website. Each CPU contains patches in patch files, and also contains files of supporting documentation ("metadata"), including a documentation roadmap. The documentation roadmap helps a human decide on appropriate patches for specific software in the systems of computers ("enterprise systems"). The metadata also indicates actions to be performed with the patch files during deployment, e.g. actions to replace files of pre-installed software with newer version of the software in files released as patches. Patches in a CPU can be either cumulative (include fixes in all earlier patches) or incremental (e.g. one-off patches).

The task of upgrading and/or patching of pre-installed software is normally handled by a human skilled in Information Technology (IT). For example, steps to be performed by IT personnel to keep the Oracle® Database software up-to-date with latest product fixes available from Oracle Corporation is described in Chapter 12 entitled "Managing Oracle Database Software" in the book Oracle® Database 2 Day DBA 11 g Release 1 (11.1), Part No. B28301-03, which is incorporated by reference herein in its entirety. An IT professional typically performs such a task on enterprise systems by first testing patch files on a test deployment (FIG. 1A) before applying them to a production system (FIG. 1B). For effective testing, the test environment is set up to resemble the production environment as closely as possible. Vendors of software products may provide software tools to assist IT professionals in selecting one or more patch files to be deployed, and thereafter automatically deploy the selected patch files to one or more computers in the enterprise systems that contain the software to be patched.

A software utility called "OPatch" is available from Oracle Corporation, Redwood Shores, Calif. Prior to installing a patch file, OPatch can be used to resolve patch conflicts, and do a version check. A patch conflict can arise, for example, if a previously applied patch touches certain files that are also touched by a new patch and the new patch is not a superset of the previously applied patch. OPatch checks for such situations and raises an error when it detects a conflict.

Another software utility called "Oracle Universal Installer" is normally used to install ORACLE products (i.e. not patches, but entire products). Oracle Universal Installer (OUI) maintains an inventory which can be used by OPatch to detect conflicts by issuing the following command "opatch apply-silent-no_bug_superset-report". The -report option detects any conflicts without applying the patch.

For more information on the above-described two tools, namely OPatch and OUI, see the following document which is incorporated by reference herein in its entirety: Chapter 7 of Oracle® Universal Installer and OPatch User's Guide, 11 g Release 1 (11.1) for Windows and UNIX, Part No. B31207-03, January 2008, entitled "Patching Oracle Software with OPatch."

Another software tool called ORACLE® Enterprise Manager 10.2.0.5 is also available from Oracle Corporation, Redwood Shores, Calif. The Enterprise Manager (EM) provides a central management console to manage computers in a system containing software from ORACLE Corporation. Using this management console, an IT professional can identify patches applicable to their enterprise system, schedule CPU patching across multiple computers in the enterprise, and apply patches to multiple ORACLE_HOMEs at the same time (scalable patching model).

If any issues arise during patch deployment, the IT professional to take corrective action can use the EM. The EM can also be used to automate parts of the CPU implementation tasks by developing the necessary extensions to existing change management tools or systems. The following article is incorporated by reference herein in its entirety as background, entitled "Saving Time and Labor On ORACLE Patching With Enterprise Manager Provisioning Pack—a case study with Oracle Internal IT" dated January 2008, by Pankaj Chandiramani and Hariprasanna Srinivasan.

Moreover, please see the following documents which are also incorporated by reference herein in their entirety as background: (1) Chapter 10 of Oracle® Enterprise Manager Advanced Configuration, 10g Release 4 (10.2.0.4.0), E10954-01, October 2007, entitled "Using Enterprise Manager For Grid Automation With Deployment Procedures." (2) Chapter 6 of Oracle® Enterprise Manager, Concepts, 10 g Release 1 (10.1), Part No. B12016-0, December 2003 entitled "Managing Deployments."

Furthermore, also incorporated by reference herein in their entirety are the following: (1) US Patent Publication 20070288903 by Manglik et al. entitled "AUTOMATED TREATMENT OF SYSTEM AND APPLICATION VALIDATION FAILURES"; (2) US Patent Publication 20080098099 by Khasnis et al. entitled "FACILITATING DEPLOYMENT OF CUSTOMIZATIONS OF ENTERPRISE APPLICATIONS"; (3) US Patent Publication 20060225072 by Lari et al, entitled "Packaging multiple groups of read-only files of an application's components into multiple shared libraries"; and (4) US Patent Publication 20080178173 by Sriram et al, entitled "Enhanced Flexibility In Deployment of Patches to Fix Errors In Pre-Installed Software."

Software tools of the type described above assist an IT professional in deploying to one or more target computers, a patch that the IT professional has personally selected e.g. based on the IT professional's knowledge of the target environment in their enterprise system. The target environment includes vendor-specific types of hardware (e.g. IBM-PC or Sun Workstation), as well as vendor-specific software, such as the type of operating system (e.g. Unix or Windows), and/or application software (e.g. PeopleSoft or Siebel).

Inventors of the current patent application note that due to the diverse nature of hardware and software in the computers of an enterprise system, deployment of patches can cause unforeseen problems. For example, the IT professional may not think of some critical functionality of a computer that is found to be adversely affected after applying a patch, resulting in the computer becoming unavailable until the original configuration is restored.

Inventors of the current patent application further note that restoring an adversely affected computer back to its original configuration is difficult and time consuming. Even if there is no critical failure, a newly-applied patch in one software tier (e.g. application software) may conflict with a previously-applied patch in another software tier (e.g. middleware software), requiring roll-back (i.e. removal) of the previously-applied patch. Accordingly, the inventors of the current patent application believe there is a need for a new tool of the type described below, to improve the process of deployment of a patch.

SUMMARY

In accordance with the invention, a computer ("patch analysis computer") is programmed to retrieve via a communication network, metadata ("patch metadata") related to one or more patches to be used to change previously installed software (e.g. to repair defects and/or upgrade functionality) in one or more computers ("target computers"). Prior to application of a patch to a target computer, the patch analysis computer performs various kinds of analyses to determine in advance the effect of application of the patches to the previously-installed software, in each target computer. One kind of analysis is based solely on patch metadata, to check if a patch is of a version currently supported for patching. Another kind of analysis is based solely on metadata related to a configuration ("configuration metadata") of each target computer, to check if resources in the target computer required to accept patching are available. Each of the just-described two kinds of analysis do not use metadata used by the other type. Still another kind of analysis is based on use of both patch metadata and configuration metadata, to check whether a patch is suitable for application to a target computer. Subsequent to performing such analysis, the patch analysis computer displays a report (on a video monitor) of results from the analysis, including one or more operations that are recommended to fix issues (if any) found during analysis. After displaying the report, the patch analysis computer receives input from a human on specific patch files and operations. In response to receipt of human input, the patch analysis computer performs operations approved by the human and applies the specific patch files to the previously-installed software in the target computer.

BRIEF DESCRIPTION OF THE FIGURES

FIG. 2A illustrates, in a high-level flow chart, operations performed by a programmed computer in several embodiments of the invention.

FIG. 3A illustrates, in an intermediate-level flow chart, operations performed by a programmed computer in some embodiments of the invention.

FIG. 3C illustrates a graphical user interface in a computer, displaying results of analysis of application of patch files to target computers identified in a configuration management database, in accordance with the invention.

FIG. 4C illustrates, in a block diagram, objects in memory of the computer of FIG. 4A used to analyze patches.

FIG. 4D illustrates, in a block diagram, information maintained in a computer-readable non-transitory storage medium of a target computer in some embodiments of the invention.

DETAILED DESCRIPTION

A computer (also called "patch analysis computer") is programmed in accordance with the invention to perform analysis on patches to be applied to computers that are to be patched ("target computers"), and based on the analysis recommend actions ("remedial operations") to be performed when the patches are applied. Conceptually one may think of a patch analysis computer as performing a "dry-run" of applying each patch to each target computer, to identify and work out any issues prior to actual deployment, i.e. identify and fix issues in each target computer without actually making any change to the software installed and running in each target computer.

Figure 1A:
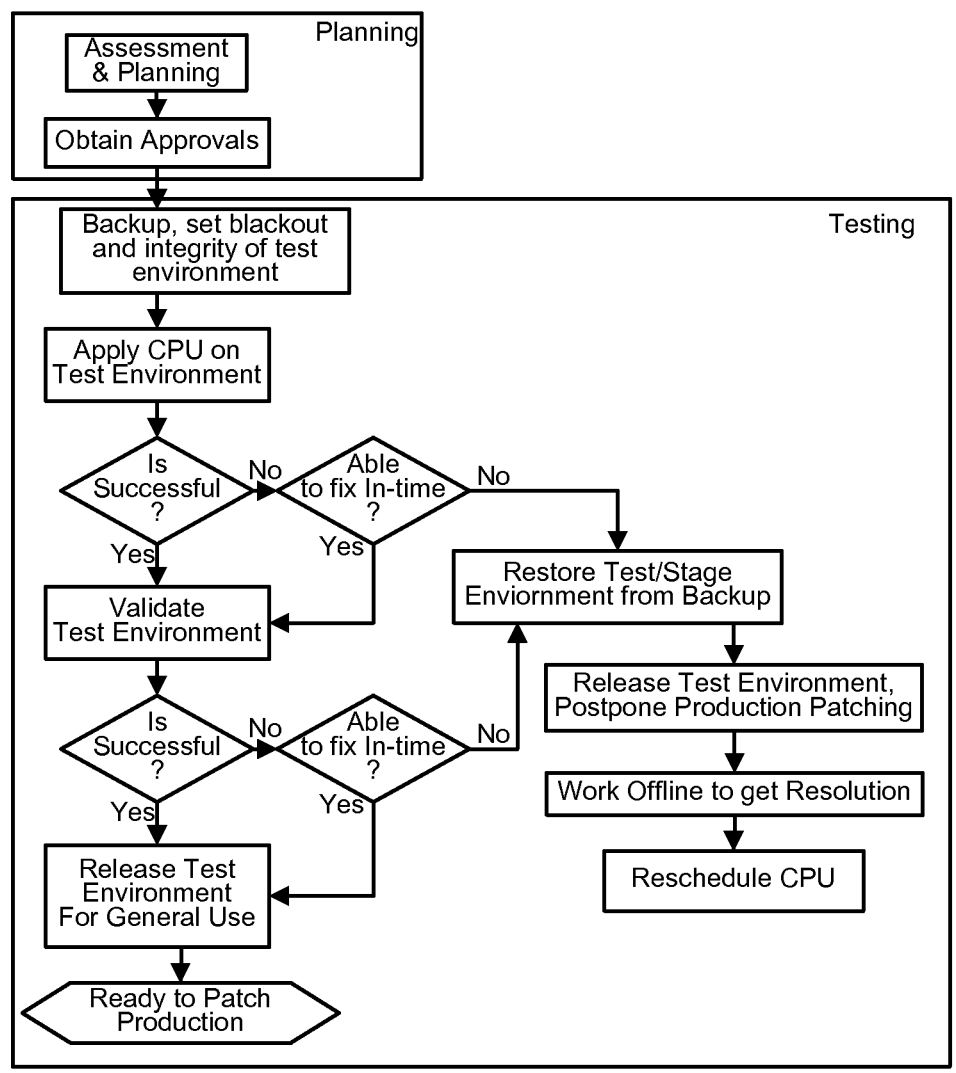
FIGS. 1A and 1B illustrate, in flow charts, acts performed in software management system of the prior art.
Figure 1B:
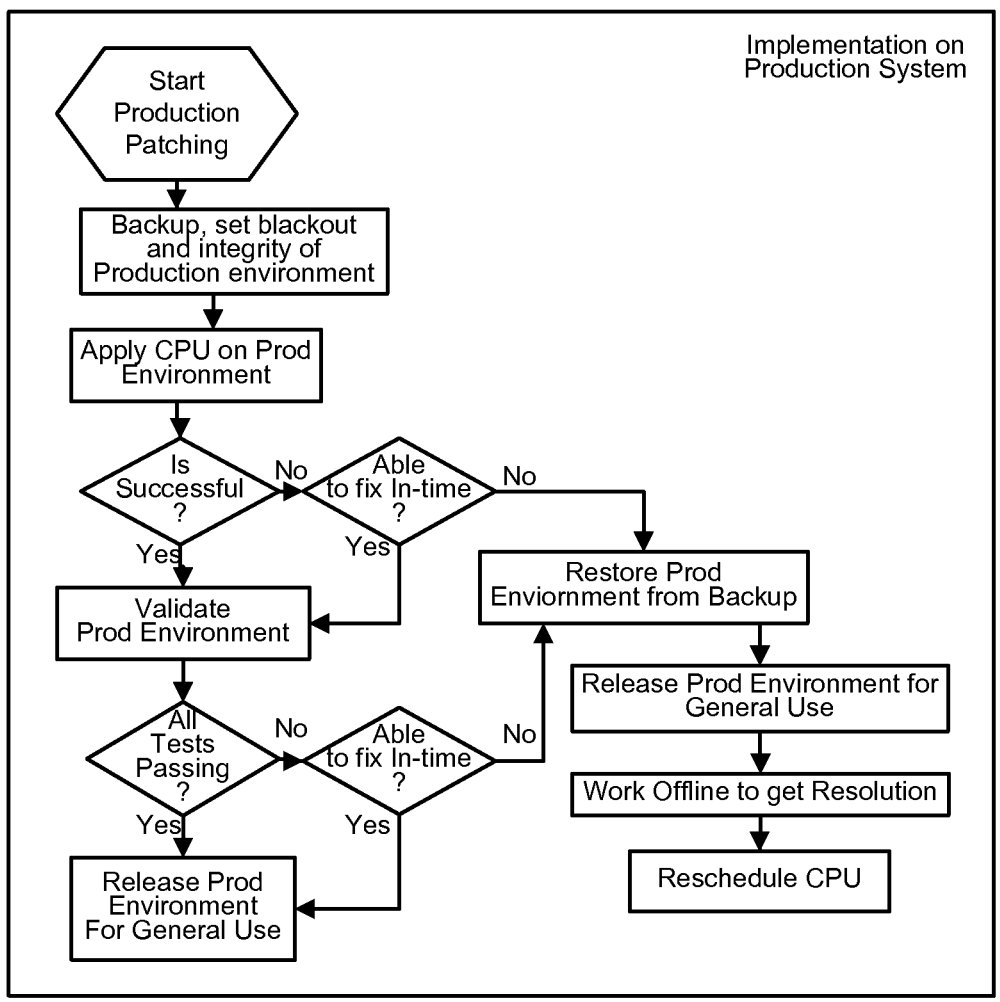
Figure 2B:
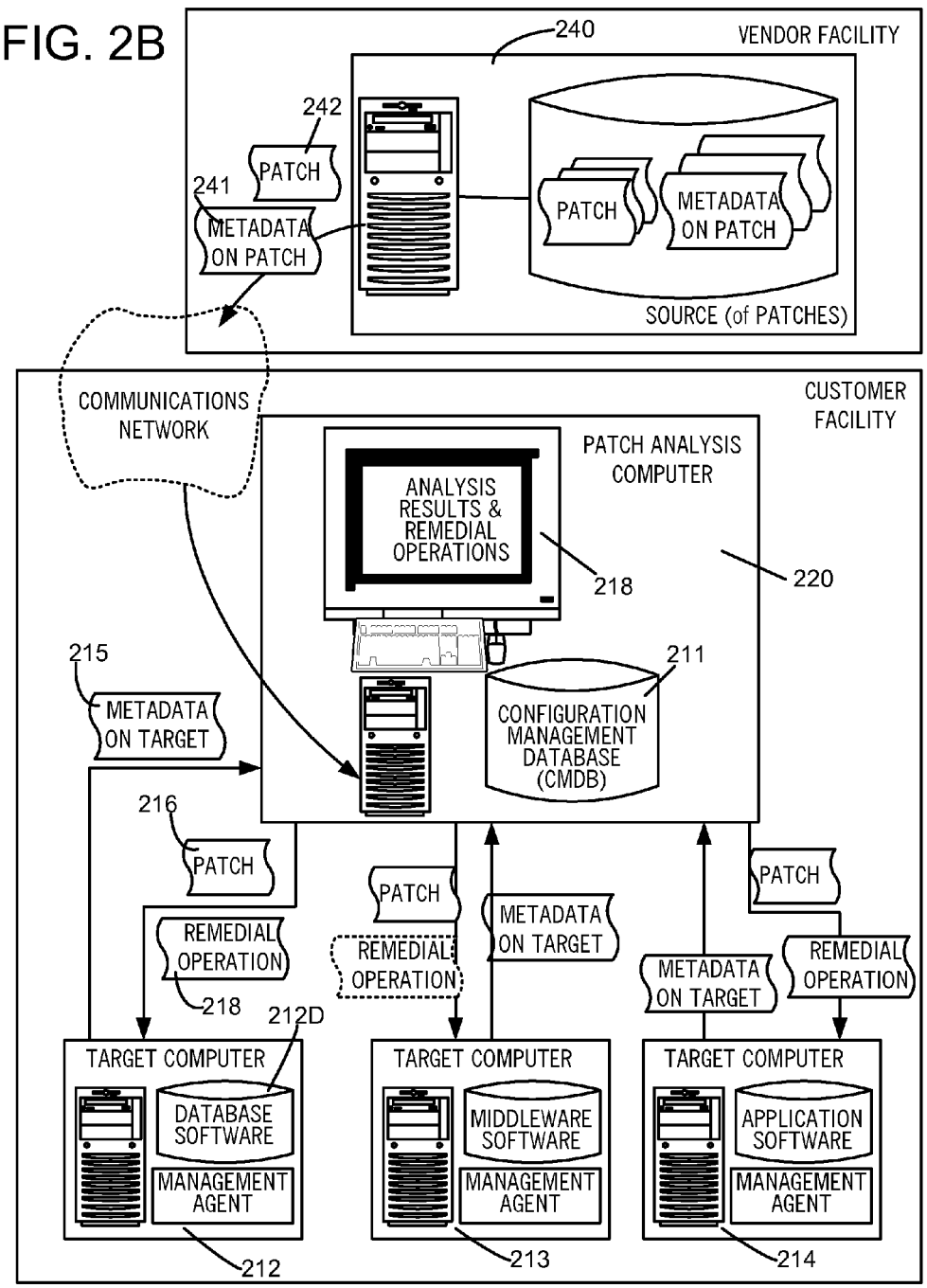
FIG. 2B illustrates, in a high-level block diagram, a computer programmed in accordance with the invention to retrieve metadata on patches, analyze based on the patch metadata, the effect of applying the patches to software in a target system, and display the results.

In many embodiments, a patch analysis method 200 (FIG. 2A) is performed in one or more computers. Method 200 obtains at least two kinds of metadata, specifically metadata related to patches in an act 201 and metadata related to computers containing previously-installed software that is to be patched ("target computers") in an act 202. Depending on the embodiment, these two acts 201 and 202 can be performed in any order relative to one another and may even be performed simultaneously if performed in different computers. As illustrated in FIG. 2B, metadata 241 is related to patches and is available from a vendor that releases the patches. Metadata 241 identifies, for example, (a) version number of the patches, and a flag indicating whether or not the patches are obsolete (b) prior patches and/or software products that are required as pre-requisites and/or co-requisites, and/or that cause conflicts.

Moreover, metadata 215 (FIG. 2B) is related to one or more target computer(s) and is available by polling the target computer(s). For a target computer, metadata 215 identifies, for example, (a) version number of patches previously applied, and/or software products previously installed, (b) available disk space, granted privileges, existing directories, running services, and supported commands. Information, which is obtained in the two kinds of metadata 241 and 215 in accordance with the invention, depends on the analysis implemented by one or more checks 203-205 (FIG. 2A) using the information.

Typically, metadata 241 (FIG. 2B) contains information on issues that may be found in applying a patch and corresponding remedial operations that correct (i.e. fix) the issues. Metadata 241 of some embodiments also contains information on which specific patch resolves which specific issue in predetermined software that is being patched. The metadata 241 is typically available for download from vendor's computer 240 (FIG. 2B) at a predetermined address on the Internet. In some embodiments, customer's computer 220 uses a database ("configuration management database" or CMDB) 211 (FIG. 2B) to store metadata 215 about the specific configuration of each of computers 212, 213 and 214 (also called "target computers"). Metadata 215 is also used in some embodiments to identify a specific patch that is applicable to each of target computers 212-214 (depending on software installed therein) and to download the identified patch 242 and its related metadata 241 into a computer-readable non-transitory storage medium, such as a hard disk for use in installation of the identified patch in target computers 212-214. Certain embodiments store patch metadata 241 in CMDB 211 (i.e. in addition to also storing configuration metadata 215 in CMDB 211).

In several embodiments of method 200 (FIG. 2A), acts 201 and 202 of collecting metadata are both performed by the same computer ("management computer") 220 that is located at a customer's facility, and uses CMDB 211 for information about the configuration of target computers 212, 213 and 214. In the embodiments shown in FIG. 2B, each of the target computers 212-214 is programmed with software ("management agent") to assist in maintaining CMDB 211 up to date (i.e. current). Specifically, management computer 220 of some embodiments uses management agents to collect information on the configuration of software that is installed in target computers 212-214, and then stores the collected information in CMDB 211. In one illustrative embodiment, a customer uses the above-described software tool called ORACLE® Enterprise Manager 10.2.0.5 available from Oracle Corporation, Redwood Shores, Calif. In alternative embodiments, instead of using management agents, management computer 220, to obtain and keep up to date the CMDB 211, polls target computers 212, 213 and 214 individually.

Note that target computers 212, 213 and 214 (FIG. 2B) are normally located at a facility owned or operated by a customer, and are used in day-to-day activities in the customer's business. In a first example, a target computer 212 (FIG. 2B) is programmed with a first type of software, which is database software (such as a relational database management system available from Oracle Corporation), and holds information needed for the customer to perform their normal business functions (e.g. sales data, employee data, customer data, etc). In a second example, a target computer 213 (FIG. 2B) is programmed with a second type of software, which is business application software (such as accounting software, HR software, and CRM software) that applies business rules and logic on data in target computer 212. Another example of application software in computer 212 is WebMD Health application. In a third example, a target computer 214 (FIG. 2B) is programmed with a third type of software, which is middleware software, such as BEA Weblogic.

In some embodiments, computer 220 (FIG. 2B) is programmed to perform act 201 (FIG. 2A) by automatically retrieving metadata related to patches that are applicable to target computers 212-214. In act 201, computer 220 retrieves metadata 241 (FIG. 2B) across a communications network (such as the Internet) from a computer 240 located at the facility owned and/or operated by a vendor of the predetermined software. Metadata 241 (FIG. 2B) is typically expressed (by the software vendor) in an extensible markup language (XML). The content of metadata 241 depends on the vendor, and for a given vendor also depends on the type of software to which the corresponding patch 242 (FIG. 2B) is applicable. This patch metadata will be used in the checks that are performed during analysis, in acts 203-205 (FIG. 2B).

In certain illustrative embodiments of the invention, prior to installation of patch files in target computers 212-214 (FIG. 2B), computer 220 (also called "patch analysis computer") performs at least three kinds of checks 203, 204 and 205 (FIG. 2A) to determine issues that would arise in application of specific patches to the to-be-patched software that is previously installed and running in one or more of target computers 212-214 (FIG. 2B). Specifically, in act 203, computer 220 checks if a predetermined patch is currently supported by the vendor (e.g. latest version released by the vendor). In act 204, computer 220 checks if the predetermined patch to be applied is appropriate for the specific software to be patched (e.g. whether disk space required for patching is less than disk space available in target). In act 205, computer 220 checks if the target has one or more resources (e.g. installer software, and administrator privilege) that are known to be needed to apply any patch.

Depending on the embodiment, acts 203, 204 and 205 may be performed in any order relative to one another. Also depending on the embodiment, acts 203 and 205 may be performed multiple times for different portions of respective metadata 241 and 215. Also, act 204 may be repeated for various combinations of the portions of metadata 241 and 215. In certain illustrative embodiments, act 203 is performed x times (e.g. 3 times) and act 205 is performed at least 10x times (e.g. 30 times). Hence, depending on the embodiments, act 205 may be performed a number of times that is one order of magnitude or more larger than the number of times act 203 is performed. Hence, several illustrative embodiments perform an exhaustive analysis of the configuration metadata and perform a cursory analysis of patch metadata (wherein one group of checks for the target computer is an order of magnitude larger in number than another group of checks for the patch to be applied).

If after performing any of acts 203, 204 and 205 (FIG. 2A), no issue is identified, then a "success" result is stored in an action 207 of method 200. Moreover, if after acts 203, 204 and 205, an issue is identified, and then a "fail" result is stored in non-volatile memory (e.g. in a database), by performing an act 207 of method 200. Any issues identified by performance of each check 203, 204 and 205 are thereafter used, in several embodiments of patch analysis method 200, to perform an act 206 of identifying one or more remedial operations ("corrective actions") followed by storing the identified operations in memory in act 207 along with results of checking.

For example, if a target computer 212 (FIG. 2B) is found in act 204 to have insufficient disk space to apply specific patch file(s), then performance of act 206 identifies as a remedial operation 218 (FIG. 2B) one or more steps (to be performed manually and/or automatically) to increase space in target computer 212 by deleting temporary files from and/or compression of its hard disk and/or by adding thereto a new hard disk. Other examples of remedial operations include adding of pre-requisite patches, and selecting a newer version of the patch etc. A specific remedial operation that is identified in act 206 (FIG. 2A) depends on a corresponding issue that is found during analysis in acts 203, 204 and 205. In some embodiments, a remedial operation is identified within patch metadata 241, for each check to be performed in acts 203, 204 and 205 (FIG. 2A).

After act 207, customer's computer 220 (FIG. 2B) displays a report on the results of patch analysis on a video monitor 218 (FIG. 2B) for review by a human (e.g. in a role of system administrator). For example, computer 220 may display on monitor 218 information on which software features and components of a target are affected by applying a specific patch. Depending on the embodiment, such a report may further identify for each of target computers 212-214 (FIG. 2B), which specific patches are expected to succeed and which particular patches are expected to fail. Computer 220 may further display, for each particular patch that is expected to fail, information on one or more remedial operations ("remediation") that may be performed to avoid failure, i.e. to proactively fix issues before they arise in patching (in act 210 of FIG. 2A). The specific information being displayed in the report by act 208 may differ, depending on the embodiment.

In some embodiments, at this stage computer 220 does not copy and install (i.e. deploy) the patch files into target computers 212-214, and instead waits (as per act 209 in FIG. 2A) to receive input from the human (also called "patch analyst") as to whether or not the analyzed patch files are approved by the human for deployment. If the report on video monitor 218 does not indicate any issues, the human provides input to computer 220 approving the installation of the patch files. In response to receipt of the human input in act 209 and if the input is approval, computer 220 performs (in act 210 of FIG. 2A) an application of patch 242 to predetermined software in target computers 212-214 (FIG. 2B). Note that patch 242 is applied with any additional patches that may be necessary to avoid violations, and/or remediation to avoid issues.

As noted elsewhere, act 210 (FIG. 2A) performs copying to target computers 212-214, patch 242 that repairs and/or upgrades the previously-installed software therein. When the just-described patch 242 is applied, remedial operations if any were identified during analysis, are also performed manually and/or automatically depending on the embodiment. In certain embodiments, if analysis indicates no issues, computer 220 automatically deploys the patch files without waiting for human approval, but if there are issues to be reported then human approval is awaited as just described.

Analysis of the effects on a target computer, resulting from deploying a patch file prior to the actual deployment is an important aspect of the invention, which provides at least four advantages as follows. Firstly, if all issues are addressed prior to deployment (e.g. by performing remedial operations), system down time is reduced (because of reduced chances of failure during deployment), which is important in some enterprise systems. Secondly, when the effects of patching are determined prior to deployment as described herein, any issues identified in patch analysis can be fixed before deployment of the patch files. Issue resolution prior to deployment saves significant time otherwise spent by a human (e.g. System Administrator) in tracking and investigating issues that are otherwise reported during a failed patch deployment.

Thirdly, patch analysis prevents catastrophic failures in enterprise systems since the patch analysis is done prior to the deployment of patch files. Fourthly, the patch analysis process is automated in many embodiments, which eliminates the need for a full-time human (e.g. patch analyst) who is otherwise required to perform this task in most enterprise environments. Hence, use of patch analysis as described above automates the task of the human, and reduces (or even eliminates) the possibility of human error in the process of patch deployment.

In some embodiments, computer 220 retrieves from a predetermined website (e.g. "metalink" website of Oracle Corporation), metadata related to patch files. The metadata in one illustrative embodiment is included in an advisory of the type issued by Oracle Corporation for patching of various ORACLE products. Act 251 (FIG. 2B) is performed repeatedly in some embodiments, e.g. on a periodic schedule, such as once a quarter. The schedule and the website are configurable by a human (e.g. a system administrator).

Figure 3B:
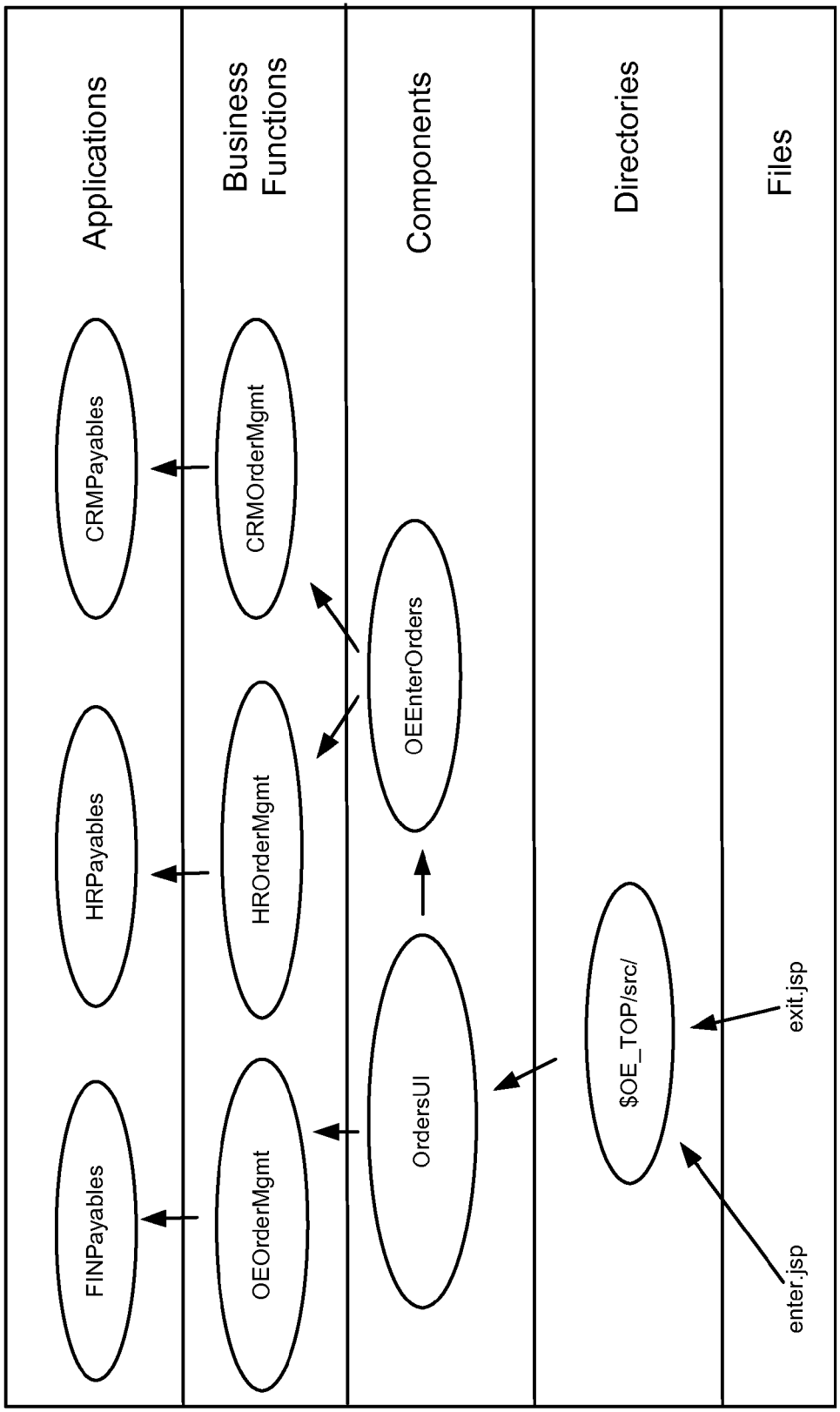
FIG. 3B illustrates, a graphical display of a result of impact analysis in an illustrative example in accordance with the invention.

In certain illustrative embodiments, computer 220 performs the method illustrated in FIG. 3A. Specifically, in act 301, computer 220 periodically retrieves patch metadata 241 from a vendor's website, and also periodically receives configuration metadata 215 from the target computers. Depending on the embodiment, the periodicity of act 301 may be same or different for the two different types of metadata. Additionally, in act 302 of FIG. 3A, computer 220 receives human input (e.g. through a graphical user interface, via a mouse and/or keyboard) a selection of patch files that are to be applied, and a selection of target computers on which the selected patch files are to be applied.

Thereafter, computer 220 performs at least three kinds of analyses, in acts 303, 304 and 305 (FIG. 3A) in a manner similar to that discussed above for acts 203, 204 and 205 (FIG. 2A). Specifically, in respective acts 303, 304, and 305 (FIG. 3A), the following analyses are performed: (a) patch readiness analysis based on patch metadata 241 but not configuration metadata 215, (b) patch-target dependency analysis based on both metadata 241 and 215, and (c) target readiness analysis based on configuration metadata 215 but not patch metadata 241. Each of these three kinds of analyses is discussed below.

During a patch readiness analysis performed in act 303, computer 220 checks whether any selections made by a human and received in act 302 during a patching session have become obsolete and/or are superseded by newer changes. Specifically, in an act 303A, computer 220 checks if a human-selected patch file is marked obsolete on the vendor's website for release of patches. If the result of checking is true, then in act 303B computer 220 identifies non-application of the selected patch file as one of the possible remedial operation.

Additionally, in an act 303C, computer 220 checks if the human-selected patch file is superseded by another version available on the vendor's website. If superseded, then in an act 303D computer 220 identifies as a remedial operation, use of said another version. For example a change C3 on Weblogic is superseded by change C6 by BEA. In such a case, this analysis operation recommends C6 be selected instead of C3.

During a dependency analysis performed in act 304, computer 220 checks whether each patch that has been selected by the user is suited to each target also selected by the user, by performing one or more of the following dependency analyses: (A) Pre-requisite analysis, (B) Cross tier co-requisite analysis and (C) Conflict analysis. These three dependency analyses may be performed in different orders relative to one another, depending on the embodiment. These three dependency analyses as performed in act 304 of one embodiment, are discussed below.

In acts 304A-304B, computer 220 performs a pre-requisite analysis. Specifically, in act 304A, computer 220 checks whether any changes to be made by the selected patch require other changes to be previously applied; for example a change C1 on a WebMD Health application requires another change C2 to be applied prior to C1. In this example, presence of change C2 in the selected patch file of the current patching session or a prior application of C2 to the target computers in another patching session is checked in act 304A. Another example is an Oracle Fusion patch requiring another Oracle Fusion patch to be applied.

Note that in several embodiments, the pre-requisite check of act 304A is performed in a manner similar or identical to Opatch, although in such embodiments computer 220 is programmed to perform its pre-requisite checking in parallel on multiple target computers (in some embodiments on all targets in an enterprise system) which is a significant improvement over Opatch. Additionally, in act 304B, computer 220 identifies as a remedial operation ("remediation"), application of the pre-requisite patch that is missing from the target computer and that is required for application of the selected patch.

In acts 304C-304D (FIG. 3A), computer 220 performs a co-requisite analysis across one or more tiers of software used in the target computers 212-214 (FIG. 2B). Specifically, in act 304C, computer 220 checks whether any changes to be made by the selected patch at one level of a multi-tiered application require other changes to be applied at another level in the same computer or in another computer; for example a change C1 on WebMD Health application in target computer 214 (FIG. 2B) requires change C3 to be applied on Weblogic middleware in target computer 213 (FIG. 2B), and the change C3 in turn requires a change C4 to be applied on an Oracle Database software in target computer 212. Accordingly, presence of changes C3 and C4 in patch files or their prior application is checked in this act 304C (FIG. 3A). Another example is an Oracle Fusion patch requiring a database patch to be applied on the database tier. Note that the database patch may itself require a SQL update and/or a configuration file update. In act 304D, computer 220 identifies as a remediation, application of any co-requisite patch that has been identified in act 304C as missing from the target computer and that is required for application of the selected patch.

In acts 304E-304F, computer 220 performs a conflict analysis. Specifically, in act 304E, computer 220 checks whether any changes to be made by the selected patch are in conflict with changes selected to be applied in the same patching session or in conflict with changes that were already applied to software on the target computer; for example a change C3 on Weblogic conflicts with a change C5 that is already applied, and absence of this conflict is checked during this analysis operation. A conflict arises when two patches have overlapping changes but each patch has at least one change that is not in the other patch. Additionally, in act 304F, computer 220 identifies as a remediation, a merge patch that includes all changes in the conflicting patches.

In some embodiments, computer 220 also performs an impact analysis in act 306, which may be performed in any order relative to above-described acts 303-305, depending on the embodiment. Act 306 is optional, and not performed in other embodiments. Specifically, in act 306 of some embodiments, computer 220 uses patch metadata 241 to identify all components that are affected by the patch. Next, computer 220 queries a model of taxonomy of software installed in target computers 212-214 to obtain relationships between files, directories, components, business functions and applications, in the form of a hierarchy of business functions and applications. The hierarchy obtained in act 306 is stored to memory (in act 307) and later displayed in a graphical form to a human (see FIG. 3B for an example). Hence the human can view identities of various components, business functions and applications that are expected to be impacted on application of the selected patch. Some embodiments of act 306 identify not only the impacted business functionality and the impacted components that need to be tested after application of the patch, but also identifies functionality that would have a downtime. Hence, the results of act 306 are stored in memory and used in some embodiments to identify testing needs after deployment of the selected patch.

In several embodiments, computer 220 performs a post-requisite analysis in act 309, which may be performed in any order relative to above-described acts 303-306, depending on the embodiment. Act 309 is also optional, and not performed in other embodiments. Specifically, in act 309 of some embodiments, computer 220 uses patch metadata 241 to identify additional patches to be applied and/or corrective actions to be taken after deploying the selected patch (including manual steps to complete deployment of the selected patch). Hence, the results of act 309 are also stored in memory in act 307, and used in some embodiments to after patch deployment.

In some embodiments, computer 220 performs a rule violation analysis in act 308, which may be performed in any order relative to above-described acts 303-306 and 309, depending on the embodiment. Act 308 is also optional, and not performed in other embodiments. Specifically, in act 308 of certain embodiments, computer 220 evaluates a number of rules ("change rules") to identify any violations and store the violations in memory. The change rule violations are used by computer 220 to identify one or more additional patches to be applied, and the identity of such additional patches is stored in memory in act 307.

During a target readiness analysis performed in act 305, computer 220 checks whether or not each target computer is ready to be patched, for example by checking for presence of appropriate attributes. As one example, in act 305A, computer 330 checks if read and write permissions are granted in each target computer so that one or more files of the to-be-patched software can be overwritten. If the result of checking is false for any specific target computer, then in act 305B computer 220 identifies as the remedial operation, the grant of read and write privileges in that specific target computer.

As another example, in act 305C, computer 330 checks if several commands that are normally issued during application of a patch are supported in each target computer. If the result of checking is false for any specific target computer, then in act 305D computer 220 identifies as the remedial operation, non-application of any patches to that specific target computer or ask the user to ensure the commands works before proceeding with the patch application.

As yet another example, in act 305E, computer 330 checks if the location of the software to be patched is identified in a variable of a predetermined name (e.g. in a registry) in each target computer. If the result of checking is false for any specific target computer, in act 305F computer 220 identifies as the remedial operation, initialization of the variable of the predetermined name to be same as a path to the location of the software in that specific target computer.

As still another example, in act 305G, computer 330 checks if one or more predetermined services (such as an installer, JDK, svchost, DLLs etc) are active in each target computer. If the result of checking is false for any specific target computer, in act 305H computer 220 identifies as the remedial operation, activation of the predetermined service(s) in that specific target computer.

After performance of one or more analysis operations as described above in acts 303-306, 308 and 309, computer 220 stores the results of analysis and remedial operations identified (if any) in act 307 (FIG. 3A). The stored results and remedial operations (if any) are displayed as a report on a video monitor 218 as illustrated in FIG. 3C. In some embodiments, the results are not displayed until a human (e.g. patch analyst) provides input, e.g. clicks a specific button (or a sequence of buttons) in a user interface, to trigger display of the report containing the results. Such a report may include, for example, information on which patches are expected to be successfully applied (labeled "pass" in FIG. 3C), and which patches are expected to fail on application (labeled "fail" in FIG. 3C).

For patches expected to fail, computer 220 of some embodiments may further include in the report being displayed, one or more remedial operations (labeled as "recommendations" in FIG. 3C). Note that in the illustration shown in FIG. 3C, only one remedial operation (see the fifth row) is identified in the "recommendations" column, as only one patch is expected to fail. For the remaining patches which are expected to pass, e.g. the first through fourth rows and sixth through tenth rows in FIG. 3C the recommendation column is blank, as they are all expected to pass. Examples of recommendations include applying other patches and/or shutting down a database instance and/or increasing available disk space and/or changing read/write permissions, etc. After display of the report, computer 220 awaits human input.

Certain embodiments of the invention perform the analysis of acts 203-205 (FIG. 2A) on a set of patch files that are selected by a human ("patch analyst") for application to specific target computers (previously identified by the human for application of patches). The human-selected patch files may be, for example, a subset of patch files that have been identified by a software vendor in an advisory (described below). The identity of patch files is maintained, in certain embodiments of the invention, in a data structure in a volatile memory of computer 220, implemented for example as a linked list.

In some embodiments, the just-described data structure is included in an object called "change cart" or simply "cart" in a memory of computer 220. To summarize, some embodiments use a change cart to hold identities of patch files that are to be analyzed and/or that are analyzed and are modified with additional patch files to be manually approved, and/or that are approved and are to be deployed. Note that use of a change cart is not a critical aspect of this invention, and as will be apparent to the skilled artisan in view of this disclosure, different data structures are used in other embodiments.

Figure 4A:
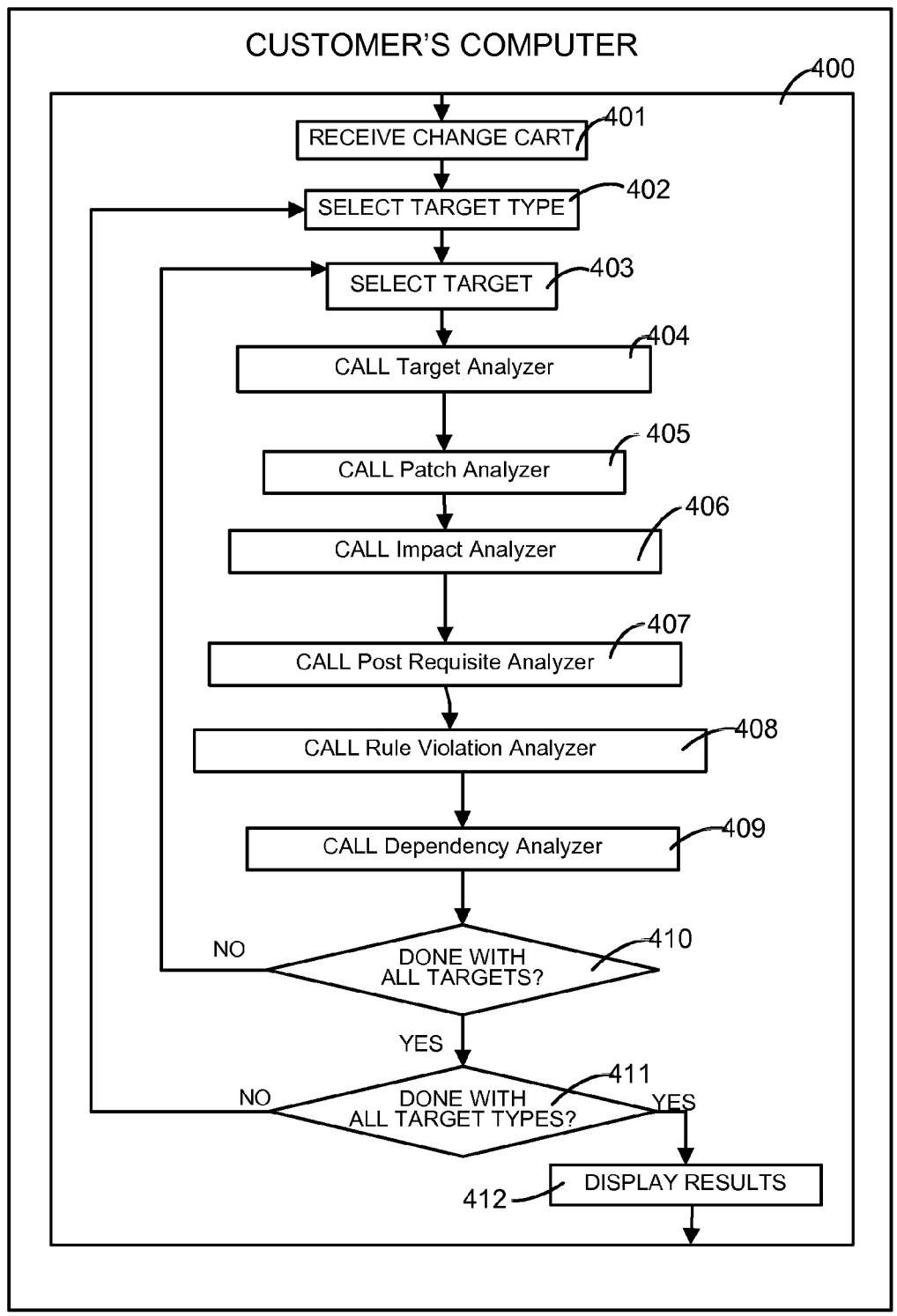
FIG. 4A illustrates, in a flow chart, acts performed by a programmed computer in one exemplary implementation of the invention.

One exemplary implementation of programming computer 220 is with software 400 called "Analysis Engine" that performs the method illustrated in FIG. 4A. The Analysis Engine has an application programming interface (API) that may be invoked to start execution of various types of analysis operations supported by the analysis engine 400. Analysis engine 400 loops through one or more acts that are repeatedly performed for each of several target computers that are identified in computer 220 for application of patches in the change cart.

Specifically, in act 401, a change cart of the type described above is received. Next, in act 402, a target type is selected from among a list of predetermined types of target computers, the type being based on the specific software which is installed in each computer. Examples of predetermined types of target computers are: Oracle Database, Oracle RAC Database, Oracle Application Server, Oracle Agent etc. Next, in act 403, a target computer (also called "target") is selected, from among multiple target computers of the target type selected in 402.

Next, in act 404, a function called "Target Analyzer" is in a loop that iterates over different target types in the change cart. For each target type (e.g. database type, middleware type and application type) selected in an iteration of the loop, computer 220 loops over all target computers of the selected type which are identified in the change cart. In the call to the function Target Analyzer, the first argument contains the execution context of a deployment service used by computer 220. Deployment service is a centralized framework used in any computer executing the software Enterprise Manager available from Oracle Corporation, for running any kind of operations on various software targets and it makes calls to specific APIs for a given operation. The second argument in a call to Target Analyzer contains the host name of the target computer. The third argument supplied to the Target Analyzer, contains directory location in a computer-readable non-transitory storage medium (e.g. hard disk) of the target computer where the software to be patched is stored. The fourth argument contains a reference to a software library in the target computer in which the patch file is stored. The fifth argument contains a list of updates that have been selected to be applied to the target computers.

When invoked, the function Target Analyzer 404 of this exemplary implementation performs the following twenty-five checks while performing target readiness analysis 304 (FIG. 3A) of a target computer. However, as will be apparent to the skilled artisan in view of this disclosure, other implementations of target readiness analysis omit one or more of these checks and/or perform additional such checks.

1. Check validity of Central Inventory location—in this check, the function Target Analyzer checks if the central inventory pointer points to a valid central inventory directory. The central inventory directory contains information of all installed software on a host along with details of any patches that has been applied on the various software installations on the host. If this check fails, the remedial operation is to ensure that the central inventory location points to the correct central inventory directory.

2. Check Central Inventory For Patching Session—in this check, function Target Analyzer checks if the above-described central inventory directory has appropriate permissions to allow reading and writing files in a session (called "RWSession") to be used in deploying patch files. If this check fails, the remedial operation is to set read and write permission for the patching user to the central inventory directory.

3. Check System Command Available—in this check, function Target Analyzer checks if all the required system commands to perform the patching operation are available or not in each of target computers 211-214. If this check fails, the remedial operation is to install and activate the identified unavailable commands.

4. Check Active Files And Executables—in this check, function Target Analyzer checks if any of the files and/or executables which are to be patched, are active in each of target computers 211-214. If this check fails the remedial action is to stop the processes that are using these files/executables.

5. Check Active Services—in this check, function Target Analyzer checks if predetermined services are active in the target computer 211-214 (e.g. if application software is to be patched, then check that the following predetermined files are being executed—EvtEng.exe, svchost.exe, jusched.exe, Isass.exe, services.exe, winlogin.exe, wdfmgr.exe). If this check fails, the remedial operation is to activate whichever service in the target computer is inactive.

6. Check If Directory For Patching Is Locked—in this check, function Target Analyzer checks if the central inventory directory is locked by previous unsuccessful session of patching (e.g. by OPatch). If this check fails, the remedial operation is to retry the patching action after the previous patching session is complete.

7. Check JDK—in this check, function Target Analyzer checks if a Java developer's kit (JDK) is installed in the target computer 211-214. If this check fails, the remedial operation is to download and install JDK.

8. Check Vendor Home—in this check, function Target Analyzer checks if the directory identified in the variable of predetermined name e.g. environmental variable ORACLE HOME has the contents needed for patching, e.g. by checking if this directory ("vendor's home directory") holds predetermined files and directories with permissions that have been predetermined as being proper ("proper permissions"). If this check fails, the remedial operation is to ensure that the environment variable points to the right installation directory and or the identified issues with the installation directory are fixed.

9. Check Installer Location—in this check, function Target Analyzer checks if the vendor's home contains predetermined software for an installer (such as OUI). If this check fails, the remedial operation is to obtain a copy of the installer.

10. Check If Installer Version Is Compatible—in this check, function Target Analyzer checks if the required version of installer software (e.g. OUI) is present in the vendor's home directory. If this check fails, the remedial operation is to obtain a copy of the installer.

11. Check Required Libraries—in this check, function Target Analyzer checks if all the required libraries are present in the vendor's home directory. If this check fails, the remedial operation is to obtain a copy of the libraries or re-install the software.

12. Check User Admin Privilege—in this check, function Target Analyzer checks if the user is root. If this check fails, the remedial operation is to run the patching session as a non-root user, 13. Check Applicable—in this check, function Target Analyzer checks if all actions of the patch are applicable for the vendor's home directory. All software installations do not have all the optional components that comes with the software install bits. Patches are applicable to one or more components. If the components required for the patch are not in the installation then the patch is not applicable. If this check fails, the remedial operation is to not apply the selected patch.

14. Check Patch Applicable On Current Platform—in this check, function Target Analyzer checks if the patch is applicable for the current platform. Patches are platform specific or generic. Software installation is platform specific. Compatibility needs to exist between the platform of the patch and that of the software installation. If this check fails, the remedial operation is to not apply the selected patch.

15. Check System Space—in this check, function Target Analyzer checks if the target computer's disk has enough free space available to install the patch. If this check fails, the remedial operation is to request a human to increase available space.

16. Check If Rollbackable—in this check, function Target Analyzer checks if the patch can be rollbacked completely. In certain cases a pre-requisite patch need to exist already in the software installation when a new patch is applied. In such a case the pre-requisite patch cannot be rollbacked unless the dependent patch is also rollbacked. If this check fails, the remedial operation is to not apply the selected patch.

17. Check Cluster Node List—in this check, function Target Analyzer checks if all the nodes in the RAC setup are valid and reachable, e.g. by sending a ping message to each node. If this check fails, the remedial operation is to ensure that all nodes of the cluster are rectified and are able to communicate with one another.

18. Check Remote Command Invocable—in this check, function Target Analyzer checks if commands can be invoked on a remote node of a cluster, e.g. by invoking a command to display a directory listing. If this check fails, the remedial operation is to ensure that all nodes of the cluster are rectified and are able to communicate with one another.

19. Check Remote Copy And Remove—in this check, function Target Analyzer checks if a file be copied and removed from the target computer, e.g. by copying a predetermined file to the target computer and then deleting it. If this check fails, the remedial operation is to ensure that all nodes of the cluster are rectified and are able to communicate with one another. The patching user must have read, write permission on remote nodes.

20. Check For Cluster Home If Cluster—in this check, function Target Analyzer checks if this is a RAC setup, then check if there logical composite directory listed in the inventory that has child node details. If the check fails then the cluster is faulty and the setup rectified.

21. Check Conflict Against Vendor Home—in this check, function Target Analyzer checks if the patches to be applied have any conflicts among themselves and with the patches present in the vendor's home directory. If this check fails, the remedial operation is to not apply the selected patch or find for superset patch that resolves the conflicts.

22. Check Installed One Offs—in this check, function Target Analyzer checks if all the specified patch IDs for rollback are present in the vendor's home directory. If this check fails, the remedial operation is to not apply/rollback the selected patch.

23. Check Patch Apply Dependents—in this check, function Target Analyzer checks if all the patches required by the given patch(es) are present in the vendor's home directory. If this check fails, the remedial operation is to not apply the selected patch.

24. Check Patch Rollback Dependents—in this check, function Target Analyzer checks if there are any patches in the vendor's home directory that depend on the patches to be rolled back. If this check fails, the remedial operation is to not apply the selected patch.

25. Check Applicable Product—in this check, function Target Analyzer checks if the patch (es) is applicable on the product type represented by the vendor's home directory. If this check fails, the remedial operation is to not apply the selected patch.

Results of performing target analysis at the end of act 404 are stored in an output file (e.g. in XML format) in each target computer 212-214 that was analyzed. In one embodiment, the output file is stored in a predetermined directory therein called "staging folder." Note that in due course, output file is transferred from the target computer's staging folder to customer's computer 220. Output file (e.g. in XML) is then parsed, and the results are stored in database tables in customer's computer 220.

Next, in act 405 (FIG. 4A), a function called "Patch Analyzer" is in a loop that iterates over multiple patches in the change cart. The Patch Analyzer (also called "MetalinkAnalyzer") uses predetermined rules and/or logic to check (e.g. see act 303 in FIG. 3A) whether or not the patch files being analyzed are the most current files available in vendor's computer 240. Following are several checks that are done during performance of patch readiness analysis (as per act 303 in FIG. 3A) using information in a vendor's computer 240, by a Patch Analyzer of some embodiments:

1) Check If Patch Is Obsolete—in this check, the Patch Analyzer checks whether the patch being applied has been marked obsolete in vendor's computer 240. If this check fails, the remedial operation is to not apply the selected patch or let the patch approver to decide taking up the newer version.

2) Check If Patch Is Password Protected—in this check, the Patch Analyzer checks whether the patch being applied is password protected. The check fails if the patch password is not provided. If this check fails, the remedial operation is to not apply the selected patch.

3) Check Patch's Version—in this check, the Patch Analyzer checks whether the patch is available for multiple versions and whether the one selected is a latest version or not. If this check fails, the remedial operation is to use the latest version of the selected patch or consciously make the decision to apply the patch of lower version. Results of act 405 are written to a database table (e.g. stored in a database (such as CMDB) in customer's computer 220 which is performing act 405), and hence this database table holds analysis results.

Next, in act 406 (FIG. 4A), a function called "Impact Analyzer" is in a loop that iterates over multiple patches in the change cart. The Impact Analyzer iterates over each patch file in the change cart and uses predetermined rules and/or logic to perform impact analysis (e.g. see act 306 in FIG. 3A). Specifically, impact analyzer of some embodiments performs the following checks:

1) Check Patch's magnitude of impacted binaries: in this check, Impact Analyzer checks if the patch's binary file is available for patching e.g. by sending a directory listing command to computer 220. This is an informational only analysis.
2) Check Commands and services impacted: in this check, function Impact Analyzer checks what all commands and services are impacted by the patch. This will bring forth the severity of the patch when certain critical commands are impacted. This is an information only analysis.
3) CheckSystemSpace: in this check, Impact Analyzer checks the total system space requirements and availability for patching a given target. If there are multiple patches to be deployed on same computer, then total space requirement of all the patches is checked for availability on the target computer. This is an informational only impact analysis.
4) Check Conflict Against Vendor's Home: in this check, Impact Analyzer checks any conflicts that the patch may have with previously installed software in the vendor's home directory on the target to which the patch is to be applied. If this check fails, the remedial operation is to not apply the selected patch.

Results of act 406 are written to the above-described database table for analysis results.

Next, in act 407 (FIG. 4A), a function called Post Requisite Analyzer is invoked to iterate over each patch in the change cart and performs a post requisite analysis by using predetermined rules and/or logic. Following are the checks done by Post Requisite Analyzer of some embodiments:

1) Check Resultant Configuration: in this check, Post Requisite Analyzer checks on a system configuration that is expected to result after application of patches, and based on analysis of the final system configuration, it reports on any issues that are identified. Based on the result of the check the user will make a call to go forward with the patching.
2) Check Privileges: in this check, Post Requisite Analyzer checks whether necessary privileges are in effect for all the patches which require special privileges to execute any post install steps. An example of post install step will to run registry updates to reflect the change done to the various sub-systems. If this check fails, the remedial operation is to not apply the selected patch.

Finally results are written to the above-described database table for analysis results.

Next, act 408 invokes a function called "Rule Violation Analyzer" (also called ConfigStdAnalyzer). The Rule Violation Analyzer iterates over each patch file in the change cart and uses predetermined rules and/or logic to check on violations (of rules in a configuration standard) that are fixed by application of the patch and also check whether any new violations may be raised by applying the patch. Following are the checks done by the Rule Violation Analyzer of some embodiments:

1) Check Violations Fixed: in this check Rule Violation Analyzer checks and reports on which violations will be fixed on the target computer after applying the selected patches.
2) Check Violations Raised: in this check, Rule Violation Analyzer checks whether there can be any new rule violations after applying the set of patches.
3) Check Violations Dependency: in this check, Rule Violation Analyzer checks inter-dependency between the violations being fixed as part of application of a set of patches. Rules can be co-related into logical groups called configuration standards. Violation of any of the rule will mean violation of the standard. There can be a hierarchy to the relationship of the rules and hence also to the violations each rules produces.

Finally results are written to the above-described database table for analysis results.

Note that a configuration standard of some embodiments is a standard by which target computers 211-214 are measured or judged by the Rule Violation Analyzer. A configuration standard is comprised of one or more rules, optionally organized into a hierarchy using rule folders, which are managed as a group. A system administrator entering human input in customer's computer 220 sets up the configuration standards, to define a desired state of software installed in target computers 212-214

Next, in act 409, a function called "Dependency Analyzer" iterates over each patch file in the change cart and uses predetermined rules and/or logic to check on pre-requisites, co-requisites, and conflicts as noted above. Following are the checks done by the Dependency Analyzer of some embodiments:

1. Check Patch's Pre-requisites: in this check Dependency Analyzer checks and reports on which pre-requisites have not been satisfied by each target. This is checking for existence of already applied pre-requisite patches on a target (not multi-tier) before newer patches can be applied or rollbacked.
2. Check Patch's Co-requisites: in this check Dependency Analyzer checks and reports on which co-requisites have not been satisfied by each target. In a multi-tier setup as in Fusion apps deployed with a relational database, trying to apply a patch on fusion apps might require certain patches to be applied on the relational database. Such cross tier dependency checks are referred to as co-requisite checks.

On completion of act 409, an act 410 is performed to check if all targets of the selected target type have been visited (e.g. if all database servers have been visited), and if not control transfers to act 403, which has been discussed above. If all targets of the selected target type have been visited, then control transfers to act 401 to check if all target types have been visited and if not control transfers to act 402 (discussed above). The types of checks perform in each of the blocks mentioned above could differ from target type to target type. The kinds of checks are metadata driven. If the answer is yes in act 411, control transfers to act 412 whereby the results stored in database tables are displayed to a human (patch analyst) in a graphical user interface (analysis UI).

Figure 4B:
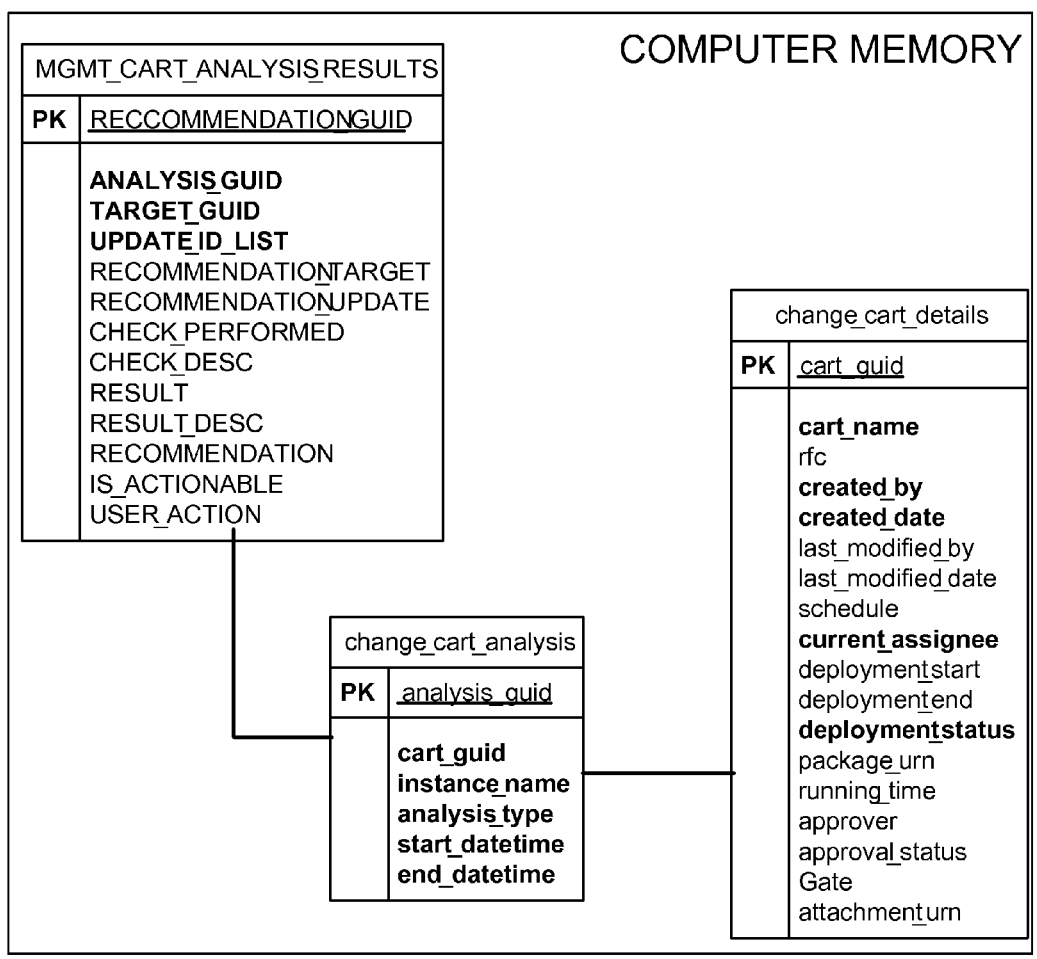
FIG. 4B illustrates, in a block diagram, database tables in a computer, in the exemplary implementation of FIG. 4A.

The method 400 illustrated in FIG. 4A is performed in some embodiments of the invention by use of three tables as illustrated in FIG. 4B. Specifically, in an illustrative embodiment, a change cart is stored in computer 220 as a row in a database table called "change_cart_details." This table contains the following columns. The first column is cart_guid, populated with a globally unique identifier that is used as an identifier of the cart. The second column is cart_name, populated with a string of characters manually typed on a keyboard by a patch analyst when creating a cart, and used thereafter to identify the cart to the patch analyst. The third column is rfc, which is populated with a string of characters manually typed on a keyboard by the patch analyst to identify a "request for change" identifier. The rfc field can be empty if the patch analyst does not have a request id for creating the change cart. The fourth column is "created_by" which identifies a name (first name followed by last name) of the patch analyst that created the cart. The fifth column is "created_date" which identifies the date on which the cart was created.

In the illustrative table change_cart_details (FIG. 4B) the sixth column is "last_modified_by" which contains the user id (e.g. name) of a person (e.g. patch analyst) who last updated any field of the change cart. The seventh column is "last_modified_date" which contains the date on which change cart was last modified. The eighth column is "schedule" which contains the planned date and time for change cart deployment start. The ninth column is "current_assignee" is the user id (e.g. name) of a person (e.g. patch analyst) to whom change cart is currently assigned. The tenth column is "deployment_start" which gives a start time of the cart deployment. The eleventh column is "deployment_end" which is approximate date and time at which deployment is expected to complete.

In the illustrative table change_cart_details (FIG. 4B), the twelfth column is "deployment_status" which contains the current state of the change cart. Various possible states are: created, assigned, reassigned, approved, rejected, analyzing, analysis succeeded, analysis failed, deploy succeeded, deploy failed. The thirteenth column is "package_urn" which contains the unique identifier of the corresponding deployment object corresponding to the cart. The fourteenth column is "running_time" which is used to store the approximate amount of duration for which the change cart deployment is expected to run. The fifteenth column is "approver" which contains user id (e.g. name) of the person who would have authority to approve or reject a change cart for deployment.

In the illustrative table change_cart_details (FIG. 4B), the sixteenth column is "approval_status" which contains the current status of cart approval. The seventeenth column is "gate" which is used to denote whether a cart is locked or open for modifications. If a gate is set on a cart, it is locked and cannot be modified by any user till the gate is unset. The eighteenth column is "attachment_urn" which contains the unique identifier of the attachments linked with the cart.

In addition to the above-described table change_cart_details in a database, some embodiments also use two additional tables, namely (1) "change_cart_analysis" and (2) "MGMT_CART_ANALYSIS_RESULTS" illustrated in FIG. 4B, which are together used to store the details of change cart analysis. Specifically, in one illustrative embodiment, table change_cart_analysis has the following five columns. First column of table change_cart_analysis is "analysis_guid" which is the unique identifier for a given analysis. The second column is "cart_guid" which is a foreign key from the above-described change_cart_details table. This foreign key is used to store an identifier of the change cart. The third column is "instance_name" which is the name of deployment instance which ran the analysis job. The fourth column is "analysis_type" which contains the type of analysis (e.g. target readiness analysis or patch readiness analysis etc) performed on the cart. The fifth column is "start_datetime" which contains start date and time for the analysis. The sixth column is "end_datetime" which the date and time at which the analysis ended.

Moreover, in the illustrative embodiment, table MGMT_CART_ANALYSIS_RESULTS contains the following thirteen columns. First column is the "recommendation_guid" which is a globally unique identifier for each recommendation from analysis engine. The second column is "analysis_guid" which is a foreign key from change_cart_analysis table. The third column is "target_guid" which is a globally unique identifier of the target computer on which the analysis recommendation is shown. The fourth column is "update_id_list" which contains update identifier for the patch. The fifth column is "recommendation_target" which contains the target identifier for which a recommendation is generated.

The sixth column of the illustrative table MGMT_CART_ANALYSIS_RESULTS is "recommendation_update" which stores the update on which the recommendation is generated. The seventh column is "check_performed" which is used to store a type of check which was performed for the given analysis type. The eighth column is "check_desc" which contains a visual description of the check performed. The ninth column is "result" which contains status of analysis check done. The result can have values "passed" and "fail". The tenth column is "result_desc" which contains description of the result obtained. The eleventh column is "recommendation" which stores recommended course of action for the given analysis result (that's whether to accept it or reject). The twelfth field is "is_actionable" which stores whether the analysis result is readonly or actionable from UI. The thirteenth column is "user_action" which describes the supported user action with the specified analysis result.

FIG. 4D illustrates information stored in a target computer in some embodiments, including the following:
a) target_name: name of the target, e.g. DB_001
b) target_type: family of the target, like standalone database, rac, Clusterware etc
c) inventory_path: installation home
d) host: machine on where installation is done (e.g. \\182.123.120.20 in FIG. 4D)
e) version: the release of the software install (e.g. 12.301.1 in FIG. 4D)
f) related targets: information of other related targets like listener, ASM (Automatic storage management), CRS (Clusterware) etc Note that the tables shown in FIG. 4B are merely illustrative of data that is stored in one embodiment of the invention, and such tables may have additional columns for other data, depending on the embodiment. Many such embodiments execute centralized software (e.g. analysis engine) to generate reports based on performance of various types of analysis, in a manner not believed to be disclosed in any prior art known to the inventors. In some embodiments, this design is generic and can be used for building an analysis engine for use in deployment of any software.

Note that in some embodiments, acts 404 to 408 are performed as described herein, within an asynchronous job which triggers each of these acts. Accordingly, in several embodiments, such acts retrieve relevant data from change_cart_details table and perform a specific type of analysis on the retrieved data. Certain embodiments implement additional tables for a change cart, for use in storing store finer details of cart contents (e.g. config standard name, rule name, update details, platform, approver etc). The additional tables are not critical to practicing the invention.

FIG. 4C illustrates, in a block diagram, objects in memory of the computer of FIG. 4A used to analyze patches. Note that in addition to the objects in FIG. 4C, there are getter and setter methods for all the attributes, which are not shown in the diagram for simplicity. Other methods of each class are explained below.

public class ChangeCart creates a deployment instance from change cart package and submits the cart for analysis. It adds an action 'Cart Analyzed' into history of the cart and returns the deployment instance name public class CartAnalysis stores the common attributes for a single analysis run for a specific analysis type. This class contains a list of recommendations, in addition to other attributes, such as analysis type, time, instance name etc. In one illustrative embodiment, the analysis engine determines recommendations and stores the recommendations in repository tables. In this embodiment, objects of this class CartAnalysis are populated using repository data when user interface screens are rendered.

Public class CartAnalysisInfo stores the results and recommendations from a single analysis run.

Public class MetalinkAnalyzer gets the ChangeCart object using the cart guid and iterates over each update in change cart and performs the metalink validations on the updates. Finally results are written to analysis result table using API's in CADataSource.

Public class ImpactAnalyzer is invoked from an Exec Java step in PatchingCart package. The method gets the ChangeCart object using the cart guid and iterates over each update in change cart and performs the impact analysis. Finally results are written to analysis result table using API's in CADataSource.

Public class PostReqAnalyzer is invoked from an Exec Java step in PatchingCart package. The method gets the ChangeCart object using the cart guid and iterates over each update in change cart and performs the post requisite analysis. Finally results are written to analysis result table using API's in CADataSource.

Public class ConfigStdAnalyzer is invoked from an Exec Java step in PatchingCart package. The method gets the ChangeCart object using the cart guid and iterates over each update in change cart and checks the Config Standard violations fixed by various patches and also checks whether any new violations may be raised by applying the patches. Finally results are written to analysis result table using API's in CADataSource.

Public class function Target Analyzer is invoked from an Exec java step called Transfer Results. The method gets the changeCart object using the cart guid, gets xml results from the target machine, parses the xml file and writes the result to analysis results tables using API's in CADatasource.

Database layer (CADatasource) class has the following methods for updating Analysis data. public void insertAnalysisResults inserts the result of analysis into table CHANGE_CART_ANALYSIS and MGMT_CART_ANALYSIS_RESULTS. public void getCartAnalysis retrieves the result of analysis for a specified change cart from repository and sets the analysis results for the change cart object.

In one illustrative embodiment of the invention, a patch analyst provides human input to computer 220 through a software tool called Enterprise Manager which is similar to the above-described ORACLE® Enterprise Manager 10.2.0.5, but modified as described herein. The Enterprise Manager of the illustrative embodiment enables a human (in the role of a patch analyst) to assign patch files to a change cart, and permits the patch analyst to access reports (FIG. 3C) resulting from analysis in act 253 (FIG. 2B). More specifically, in the illustrative embodiment, the Enterprise Manager includes software called Change Management which provides an automated workflow-enabled way to have software in target computers adhere to a set of configuration standards In the illustrative embodiment, one particular type of configuration standard is called "Change Management Configuration Standards" if it contains one or more Change Rules. A Change Rule is a rule that is supported by the Change Advisor (described below). A Change Advisor supports a set of rules based on the type, subtype and reason of the rule. A Change Rule when executed stores in memory of vendor computer 220, violation context information on a software update to be applied, to fix the violation of the rule. A specific type of Change Management Configuration Standard is called "Patch Configuration Standards" if it specifies the set of software updates (patches) that need to be applied based on some criteria. A Patch Configuration Standard consists of Patch Rules. A Patch rule is a rule that describes patches to be applied on a product installation. The patch rule when executed, also stores in memory of vendor computer 220, its violation context including an identity of the software update and a target computer that requires the software update.

In the illustrative embodiment, Change Management uses software called Change Advisor to perform repeated monitoring of configuration standards in computer 220. Change Advisor repeatedly also monitors vendor's computer 240 to check for any required patch files (also called "software updates"). Change Advisor displays software updates that are recommended by a software vendor for the specific software installed in the customer's target computers (also called "software environment"). Specifically, Change Advisor displays to a patch analyst the software updates to be applied on software installed in target computers, based on advisories and optionally also based on additional information in the form of Recommended Software Updates and/or Certified Configuration of the type published by Oracle Corporation.

In the illustrative embodiment, an advisory is information published by the software vendor detailing issues in their previously-released software and identities of software updates that resolve the issues. Customers are advised to use the advisory to do a status check on their installed software, and apply those software updates that are applicable to their software (in target computers). An advisory is expressed in the form of meta-data conforming to a published schema. One specific type of advisory is called "Critical Patch Advisory" which has information on security vulnerabilities in the software and identifies a critical patch update. A critical patch update is a one off patch or a patchset that resolves an issue in an advisory.

In the illustrative embodiment, a Recommended Software Update is created when a list of recommended software updates (i.e. patches) is downloaded by Enterprise Manager from the vendor's computer 240. A Change Rule in the Recommended Software Update, when executed, evaluates the applicability of recommended software updates in the downloaded list on the installed software in the customer's target computers. A Certified Configuration specifies rules of configuration of Oracle product installations in a target computer, published by the software vendor (e.g. Oracle Corporation) as best practices.

In the illustrative embodiment, the Change Advisor guides a patch analyst through the process of analyzing software updates they choose to apply to the target computers. Change Advisor works in tandem with one or more software update management modules. Change Advisor uses a software updates automation module to apply software updates to an Oracle installation in the target computers. Patching in the illustrative embodiment allows a BPEL based process workflow that guides the patch analyst through getting advice on software updates via the Change Advisor, creating and analyzing the change cart, approval of updates in the change cart to application of the updates on the target computers.

In the illustrative embodiment, a Change Rule includes information on how to remediate or fix a violation of that Change Rule. The remediation information is put into the violation context of a DMQL query that expresses the Change Rule. The DMQL query in a Change Rule returns an identity of the target computer in violation, a package template that fixes the violation, as well as parameters to pass to a package instantiated by the package template, to fix the violation.

In the illustrative embodiment, the Change Advisor operates on metadata which is expressed in an XML file called the ChangeAdvisorRule metadata. Humans, such as system administrators, system integrators and patch analysts can enter new entries into this file. Use of the file allows the Change Advisor to support new types of rules that may be expressed in Configuration Standards, as well as enables a human to identify a package to be used to remediate violation of the rule. In the illustrative embodiment, the ChangeAdvisorRule meta-data has the following information: Type, Subtype, Reason of Rule, Package Template, and Parameter List.

More specifically, in the illustrative embodiment, the Change Advisor works with metadata that expresses the type, subtype and reason of the rules that the Change Advisor knows about. The set of type-subtype-reason of Rules supported by the Change Advisor is specified in ChangeAdvisorRule metadata. The metadata includes additional information on the package to be deployed to remediate a violation of the Change Rule, the parameter list to pass to the package, and the parameter list to display to a human in the context of the Change Advisor GUI. For each type-subtype-rule entry in the ChangeAdvisorRule meta-data, the package template and the parameter list is specified in the same meta-data. Examples of the metadata are listed in the following table:

| Type | Subtype | Package Template | Parameter List |
|---|---|---|---|
| Oracle Software Update | Critical Patches | Oracle Software Update package | PatchIDs |
| Oracle Software Update | Recommended Patches | Oracle Software Update package | PatchIDs |
| Linux Update | | Linux Update package | RPMList |
| Customer inserted type | Customer inserted sub type | | PatchIDs, portNos |

In the illustrative embodiment, the Change Advisor enables the patch analyst to see a report of software updates, with minimum impact or with maximum coverage. The report type is specified in a setup of the Change Advisor. In one type, the report shows software updates with minimum impact at the same code level (same patchset level) or the ones in which the minimum upgrade is required. In another type, the report shows software updates with maximum coverage at the latest code level (latest patchset level).

The method of FIG. 2A may be used to program a computer system 1000 of the type illustrated in FIG. 5A, which is discussed next. Specifically, computer system 200 includes a bus 1102 (FIG. 5A) or other communication mechanism for communicating information, and a processor 1105 coupled with bus 1102 for processing information. Computer system 200 also includes a main memory 1106, such as a random access memory (RAM) or other dynamic storage device, coupled to bus 1102 for storing information and instructions (e.g. for the method of FIG. 2A) to be executed by processor 1105.

Main memory 1106 also may be used for storing temporary variables or other intermediate information (e.g. patch metadata as shown in FIG. 2A and/or configuration information) during execution of instructions to be executed by processor 1105. Computer system 200 further includes a computer-readable non-transitory storage medium, such as a read only memory (ROM) 1104 or other static storage device coupled to bus 1102 for storing static information and instructions for processor 1105. A storage device 1110, such as a magnetic disk or optical disk, is provided and coupled to bus 1102 for storing information and instructions.

Computer system 200 may be coupled via bus 1102 to a display device or video monitor 1112 such as a cathode ray tube (CRT) or a liquid crystal display (LCD), for displaying information to a computer user. An input device 1114, including alphanumeric and other keys (e.g. of a keyboard), is coupled to bus 1102 for communicating information and command selections to processor 1105. Another type of user input device is cursor control 1116, such as a mouse, a trackball, or cursor direction keys for communicating direction information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, collecting and analyzing statistics of components in a distributed database system is performed by computer system 200 in response to processor 1105 executing one or more sequences of one or more instructions contained in main memory 1106. Such instructions may be read into main memory 1106 from another computer-readable non-transitory storage medium, such as storage device 1110. Execution of the sequences of instructions contained in main memory 1106 causes processor 1105 to perform the operations of a process described herein and illustrated in FIG. 2A. In alternative embodiments, hard-wired circuitry may be used in place of or in combination with software instructions to implement the invention. Thus, embodiments of the invention are not limited to any specific combination of hardware circuitry and software.

The term "computer-readable non-transitory storage medium" as used herein refers to any storage medium that holds information in a non-transitory manner, and participates in providing instructions and/or data to processor 1105 for execution therein and/or thereon. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110.

Volatile storage media includes dynamic memory, such as main memory 1106 which may be implemented in the form of a random access memory or RAM.

Instead of or in addition to a computer-readable non-transitory storage medium, a transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a non-transitory storage medium from which a computer can read information, such as data and/or code. Specifically, various forms of computer-readable non-transitory storage medium may be involved in providing one or more sequences of one or more instructions to processor 1105 for execution. For example, the instructions may initially be comprised in a storage device, such as a magnetic disk, of a remote computer (e.g. vendor's computer). The remote computer can load the instructions into its dynamic memory (RAM) and send the instructions over a telephone line using a modem. A modem local to computer system 200 can receive the information on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 200 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 200, are exemplary forms of carrier waves transporting the information.

Computer system 200 can send messages and receive data, including program code, through the network(s), network link 1120 and communication interface 1115. In the Internet example, a server 1100 might transmit statistics of components in a distributed database system through Internet 1124, ISP 1126, local network 1122 and communication interface 1115.

The instructions for performing the operations of FIG. 2A may be executed by processor 1105 as they are received, and/or stored in storage device 1110, or other non-volatile storage for later execution. In this manner, computer system 200 may obtain the just-described instructions and any related data in the form of a carrier wave.

Figure 5A:
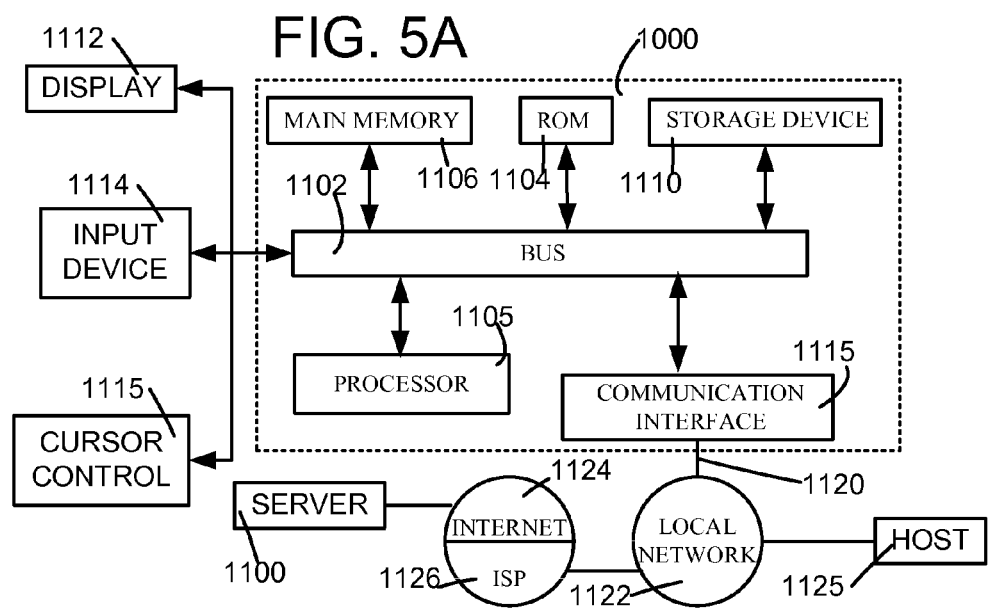
FIGS. 5A and 5B illustrate, in block diagrams, hardware and software portions of a computer that performs the method illustrated in FIG. 2A, in a system of computers of the type shown in FIG. 2B.
Figure 5B:
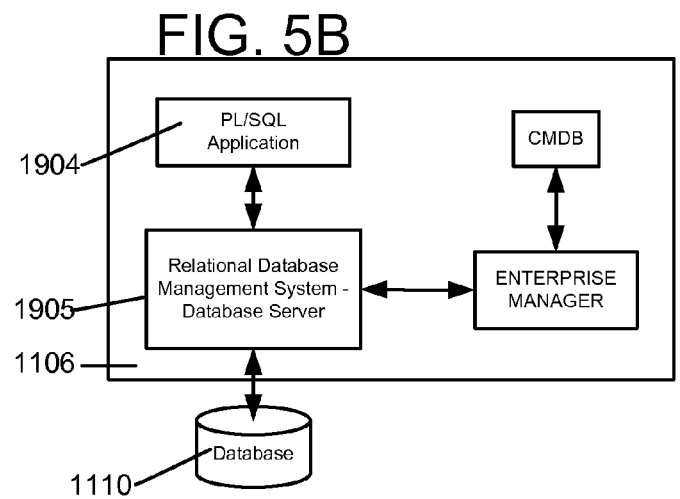

Note that FIG. 5A is a very low-level representation of many hardware components of a computer system. Several embodiments have one or more additional software components in main memory 1106 as shown in FIG. 5B: Database Server 1905 (e.g. a server available from ORACLE Corporation) that provides access to a source database, and a PL/SQL application 1904 which changes records in the source database via an interface provided a database management system in server 1905.

Numerous modifications and adaptations of the embodiments described herein will become apparent to the skilled artisan in view of this disclosure. In some embodiments, there can be more than one versions of a patch with given patch identifier. For example a patch may be applicable on 10.2.0.1 and 10.2.0.2 databases, and if so there are 2 valid versions of this patch. Hence, in such embodiments, vendor's computer 240 checks if the patch to be applied is an obsoleted version which is available but not recommended by the vendor and if so notifies the patch analyst. Numerous modifications and adaptations of the embodiments described herein are encompassed by the scope of the invention.

What is claimed is:

1. A computer-readable non-transitory storage medium comprising a plurality of instructions to be executed in a computer-implemented method, said storage medium comprising:

a plurality of first instructions to check a plurality of predetermined conditions, to identify a set of issues to arise in applying at least one predetermined patch to at least one predetermined software previously installed in each target computer in a plurality of target computers;

wherein the plurality of first instructions use metadata comprising configuration metadata from said each target computer in said plurality of target computers and patch metadata from a source of said at least one predetermined patch;

wherein a group of first predetermined conditions in said plurality of predetermined conditions use said configuration metadata but not said patch metadata, to check if resources needed for patching are available in said each target computer, said group of first predetermined conditions comprising a first predetermined condition to check whether administrator privilege is granted in said each target computer;

wherein a group of second predetermined conditions in said plurality of predetermined conditions use said patch metadata but not said configuration metadata, to check if said at least one predetermined patch is currently supported, said group of second predetermined conditions comprising a second predetermined condition to check whether said at least one predetermined patch is a latest version;

wherein a group of third predetermined conditions in said plurality of predetermined conditions use said configuration metadata and said patch metadata in combination, to check whether said at least one predetermined patch is applicable to said each target computer, said group of third predetermined conditions comprising a third predetermined condition to check whether disk space required for patching is less than disk space available in said each target computer;

a plurality of second instructions to select at least one predetermined operation to be performed to correct at least one predetermined issue in said set of issues identified by execution of said plurality of first instructions; and a plurality of third instructions to be executed prior to application of said at least one predetermined patch to said at least one predetermined software, to store in a memory, a first plurality of results of execution of said plurality of first instructions and a second plurality of results of execution of said plurality of second instructions.

2. The computer-readable non-transitory storage medium of claim 1 wherein:

another third predetermined condition in said group of third predetermined conditions comprises using at least a portion of said configuration metadata and a portion of said patch metadata to check at least one of (a) whether another patch known to be a pre-requisite was previously applied to said at least one predetermined software and (b) whether said another patch is planned to be applied to said at least one predetermined software prior to application of said at least one predetermined patch and yet another predetermined operation selected by said plurality of second instructions comprises applying said another patch in said at least one specific target computer.

3. The computer-readable non-transitory storage medium of claim 1 wherein:

application of said at least one predetermined patch to said at least one predetermined software requires prior application of a first additional patch to a first additional software, and further requires prior application of a second additional patch to a second additional software;

a third predetermined condition in said group of third predetermined conditions comprises checking at least one of (a) whether each said prior applications has been performed and (b) whether said first additional patch and said second additional patch are planned to be applied prior to said application of said at least one predetermined patch; and another predetermined operation is additionally selected by said plurality of second instructions, and comprises applying at least one of said first additional patch and said second additional patch.

4. The computer-readable non-transitory storage medium of claim 1 wherein:

another third predetermined condition in said group of third predetermined conditions checks whether any patch previously applied to said at least one predetermined software conflicts with said at least one predetermined patch; and said at least one predetermined operation is to not apply said at least one predetermined patch to at least one specific target computer in said plurality of target computers.

5. The computer-readable non-transitory storage medium of claim 1 wherein:

an additional third predetermined condition in said group of third predetermined conditions checks whether said at least one predetermined patch conflicts with any patch previously applied to another predetermined software; and said at least one predetermined operation is to not apply said at least one predetermined patch to at least one specific target computer in said plurality of target computers.

6. The computer-readable non-transitory storage medium of claim 1 further comprising:

a plurality of fourth instructions to be executed prior to application of said at least one predetermined patch to said at least one predetermined software, to retrieve from said memory and display said first plurality of results of execution of said plurality of first instructions and said second plurality of results of execution of said plurality of second instructions, and to receive input related to said at least one predetermined operation.

7. The computer-readable non-transitory storage medium of claim 1 wherein:

one second predetermined condition in said group of second predetermined conditions checks whether said at least one predetermined patch is obsolete; and said at least one predetermined operation is to not use or go ahead with said at least one predetermined patch.

8. A computer comprising a processor and a memory coupled to the processor, the memory comprising:

a plurality of first instructions to check a plurality of predetermined conditions, to identify a set of issues to arise in applying at least one predetermined patch to at least one predetermined software previously installed in each target computer in a plurality of target computers;

wherein the plurality of first instructions use metadata comprising configuration metadata from said each target computer in said plurality of target computers and patch metadata from a source of said at least one predetermined patch;

wherein a group of first predetermined conditions in said plurality of predetermined conditions use said configuration metadata but not said patch metadata, to check if resources in said each target computer needed to accept patching are available, said group of first predetermined conditions comprising a first predetermined condition to check whether administrator privilege is granted in said each target computer;

wherein a group of second predetermined conditions in said plurality of predetermined conditions use said patch metadata but not said configuration metadata, to check if said at least one predetermined patch is currently supported for patching, said group of second predetermined conditions comprising a second predetermined condition to check whether said at least one predetermined patch is a latest version;

wherein a group of third predetermined conditions in said plurality of predetermined conditions use said configuration metadata and said patch metadata in combination, to check whether said at least one predetermined patch is applicable to said each target computer, said group of third predetermined conditions comprising a third predetermined condition to check whether disk space required for patching is less than disk space available in said each target computer;

a plurality of second instructions to use a table in said memory to select at least one predetermined operation to be performed to overcome at least one predetermined issue in said set of issues identified by execution of said plurality of first instructions; and a plurality of third instructions to be executed prior to application of said at least one predetermined patch to said at least one predetermined software, to store in a memory, a first plurality of results of execution of said plurality of first instructions and a second plurality of results of execution of said plurality of second instructions.

9. The computer of claim 8 wherein:

another third predetermined condition in said group of third predetermined conditions comprises using at least a portion of said configuration metadata and a portion of said patch metadata to check at least one of (a) whether another patch known to be a pre-requisite was previously applied to said at least one predetermined software and (b) whether said another patch is planned to be applied to said at least one predetermined software prior to application of said at least one predetermined patch and yet another predetermined operation selected by said plurality of second instructions comprises applying said another patch in said at least one specific target computer.

10. An apparatus for analyzing software changes, the apparatus comprising:

means for checking a plurality of predetermined conditions, to identify a set of issues known to arise in applying at least one predetermined patch to at least one predetermined software previously installed in each target computer in a plurality of target computers;

wherein the means for checking uses metadata comprising configuration metadata from said each target computer in said plurality of target computers and patch metadata from a source of said at least one predetermined patch;

wherein a group of first predetermined conditions in said plurality of predetermined conditions use said configuration metadata but not said patch metadata, to check if resources in said each target computer needed to accept patching are available, said group of first predetermined conditions comprising a first predetermined condition to check whether administrator privilege is granted in said each target computer;

wherein a group of second predetermined conditions in said plurality of predetermined conditions use said patch metadata but not said configuration metadata, to check if said at least one predetermined patch is currently supported for patching, said group of second predetermined conditions comprising a second predetermined condition to check whether said at least one predetermined patch is a latest version;

wherein a group of third predetermined conditions in said plurality of predetermined conditions use said configuration metadata and said patch metadata in combination, to check whether said at least one predetermined patch is applicable to said each target computer, said group of third predetermined conditions comprising a third predetermined condition to check whether disk space required for patching is less than disk space available in said each target computer;

means for selecting at least one predetermined operation to be performed to overcome at least one predetermined issue in said set of issues identified by said means for checking; and means for storing in a memory, a first plurality of results from said means for checking and a second plurality of results from said means for selecting.

11. A computer-implemented method for analyzing software changes, the method comprising:

checking a plurality of predetermined conditions, to identify a set of issues to arise in applying at least one predetermined patch to at least one predetermined software previously installed in each target computer in a plurality of target computers;

wherein said checking uses metadata comprising configuration metadata from said each target computer in said plurality of target computers and patch metadata from a source of said at least one predetermined patch;

wherein a group of first predetermined conditions in said plurality of predetermined conditions use said configuration metadata but not said patch metadata, to check if resources in said each target computer predetermined to be needed to accept patching are available, said group of first predetermined conditions comprising a first predetermined condition to check whether administrator privilege is granted in said each target computer;

wherein a group of second predetermined conditions in said plurality of predetermined conditions use said patch metadata but not said configuration metadata, to check if said at least one predetermined patch is currently supported for patching, said group of second predetermined conditions comprising a second predetermined condition to check whether said at least one predetermined patch is a latest version;

wherein a group of third predetermined conditions in said plurality of predetermined conditions use said configuration metadata and said patch metadata in combination, to check whether said at least one predetermined patch is applicable to said each target computer, said group of third predetermined conditions comprising a third predetermined condition to check whether disk space required for patching is less than disk space available in said each target computer;

at least one processor selecting at least one predetermined operation to be performed to overcome at least one predetermined issue in said set of issues identified by said checking; and storing in a memory coupled to said at least one processor, a first plurality of results of said checking and a second plurality of results of said selecting.

12. The computer-implemented method of claim 11 wherein:

another third predetermined condition in said group of third predetermined conditions comprises using at least a portion of said configuration metadata and a portion of said patch metadata to check at least one of (a) whether another patch known to be a pre-requisite was previously applied to said at least one predetermined software and (b) whether said another patch is planned to be applied to said at least one predetermined software prior to application of said at least one predetermined patch and yet another predetermined operation selected by said plurality of second instructions comprises applying said another patch in said at least one specific target computer.

13. The computer-implemented method of claim 11 wherein:

application of said at least one predetermined patch to said at least one predetermined software requires prior application of a first additional patch to a first additional software, and further requires prior application of a second additional patch to a second additional software;

another third predetermined condition in said group of third predetermined conditions comprises checking at least one of (a) whether each said prior applications has been performed and (b) whether said first additional patch and said second additional patch are planned to be applied prior to said application of said at least one predetermined patch; and another predetermined operation selected by said plurality of second instructions comprises applying at least one of said first additional patch and said second additional patch.

14. The computer-implemented method of claim 11 wherein:
another third predetermined condition in said group of third predetermined conditions checks whether any patch previously applied to said at least one predetermined software conflicts with said at least one predetermined patch; and
said at least one predetermined operation is to not apply said at least one predetermined patch to at least one specific target computer in said plurality of target computers.

15. The computer-implemented method of claim 11 wherein:
an additional third predetermined condition in said group of third predetermined conditions checks whether said at least one predetermined patch conflicts with any patch previously applied to another predetermined software; and
said at least one predetermined operation is to not apply said at least one predetermined patch to at least one specific target computer in said plurality of target computers.

16. The computer-implemented method of claim 11 further comprising:
prior to application of said at least one predetermined patch to said at least one predetermined software, retrieving from said memory and displaying said first plurality of results of said checking and said second plurality of results of said selecting, and to receive input related to said at least one predetermined operation.

17. The computer-implemented method of claim 11 wherein:
one second predetermined condition in said group of second predetermined conditions checks whether said at least one predetermined patch is obsolete; and
said at least one predetermined operation is to not use or go ahead with said at least one predetermined patch.

18. The computer of claim 8 wherein:
an additional third predetermined condition in said group of third predetermined conditions checks whether said at least one predetermined patch conflicts with any patch previously applied to another predetermined software; and
said at least one predetermined operation is to not apply said at least one predetermined patch to at least one specific target computer in said plurality of target computers.

19. The computer of claim 8 wherein:
a plurality of fourth instructions to be executed prior to application of said at least one predetermined patch to said at least one predetermined software, to retrieve from said memory and display said first plurality of results of execution of said plurality of first instructions and said second plurality of results of execution of said plurality of second instructions, and to receive input related to said at least one predetermined operation.

20. The computer of claim 8 wherein:
one second predetermined condition in said group of second predetermined conditions checks whether said at least one predetermined patch is obsolete; and
said at least one predetermined operation is to not use or go ahead with said at least one predetermined patch.

* * * * *

UNITED STATES PATENT AND TRADEMARK OFFICE
CERTIFICATE OF CORRECTION

PATENT NO. : 8,893,106 B2  
APPLICATION NO. : 13/035954  
DATED : November 18, 2014  
INVENTOR(S) : Ningombam et al.

Page 1 of 1

It is certified that error appears in the above-identified patent and that said Letters Patent is hereby corrected as shown below:

In the Drawings

On sheet 9 of 12, in figure 4B, line 4, delete "RECCOMMENDATION" and insert -- RECOMMENDATION --, therefor.

On sheet 10 of 12, in figure 4C, line 12, delete "CADataSourc" and insert -- CADataSource --, therefor.

In the Specification

In column 12, lines 54-55, delete "Isass.exe," and insert -- Lsass.exe, --, therefor.

In column 13, lines 10-11, delete "and or" and insert -- and/or --, therefor.

Signed and Sealed this  
Twenty-third Day of June, 2015

Michelle K. Lee  
*Director of the United States Patent and Trademark Office*